US010331784B2

(12) United States Patent
Swart et al.

(10) Patent No.: US 10,331,784 B2
(45) Date of Patent: Jun. 25, 2019

(54) SYSTEM AND METHOD OF DISAMBIGUATING NATURAL LANGUAGE PROCESSING REQUESTS

(71) Applicant: VoiceBox Technologies Corporation, Bellevue, WA (US)

(72) Inventors: Erik Swart, Bellevue, WA (US); Emilie Drouin, Bellevue, WA (US)

(73) Assignee: Voicebox Technologies Corporation, Bellevue, WA (US)

( * ) Notice: Subject to any disclaimer, the term of this patent is extended or adjusted under 35 U.S.C. 154(b) by 0 days.

(21) Appl. No.: 15/664,249

(22) Filed: Jul. 31, 2017

(65) Prior Publication Data

US 2018/0032503 A1 Feb. 1, 2018

Related U.S. Application Data

(60) Provisional application No. 62/368,975, filed on Jul. 29, 2016.

(51) Int. Cl.
 G06F 17/27 (2006.01)
 G06F 16/21 (2019.01)
 (Continued)

(52) U.S. Cl.
 CPC .......... G06F 17/278 (2013.01); G06F 16/219 (2019.01); G06F 16/243 (2019.01);
 (Continued)

(58) Field of Classification Search
 CPC combination set(s) only.
 See application file for complete search history.

(56) References Cited

U.S. PATENT DOCUMENTS

| 4,430,669 A | 2/1984 | Cheung |
| 4,821,027 A | 4/1989 | Mallory |

(Continued)

FOREIGN PATENT DOCUMENTS

| CN | 1433554 A | 7/2003 |
| CN | 1860496 A | 11/2006 |

(Continued)

OTHER PUBLICATIONS

"Statement in Accordance with the Notice from the European Patent Office" dated Oct. 1, 2007 Concerning Business Methods (OJ EPO Nov. 2007, 592-593), XP002456252.

(Continued)

*Primary Examiner* — Abul K Azad
(74) *Attorney, Agent, or Firm* — Ohlandt, Greeley, Ruggiero & Perle, L.L.P.

(57) ABSTRACT

A system and method is provided of disambiguating natural language processing requests based on smart matching, request confirmations that are used until ambiguities are resolved, and machine learning. Smart matching may match entities (e.g., contact names, place names, etc.) based on user information such as call logs, user preferences, etc. If multiple matches are found and disambiguation has not yet been learned by the system, the system may request that the user identify the intended entity. On the other hand, if disambiguation has been learned by the system, the system may execute the request without confirmations. The system may use a record of confirmations and/or other information to continuously learn a user's inputs in order to reduce ambiguities and no longer prompt for confirmations.

30 Claims, 4 Drawing Sheets

(51) Int. Cl.
*G06F 16/242* (2019.01)
*G06F 16/9535* (2019.01)
*G06F 16/2457* (2019.01)
*G06F 16/9032* (2019.01)

(52) U.S. Cl.
CPC .. *G06F 16/24575* (2019.01); *G06F 16/90332* (2019.01); *G06F 16/9535* (2019.01); *G06F 17/2785* (2013.01)

(56) References Cited

U.S. PATENT DOCUMENTS

| | | |
|---|---|---|
| 4,829,423 A | 5/1989 | Tennant |
| 4,887,212 A | 12/1989 | Zamora |
| 4,910,784 A | 3/1990 | Doddington |
| 5,027,406 A | 6/1991 | Roberts |
| 5,155,743 A | 10/1992 | Jacobs |
| 5,164,904 A | 11/1992 | Sumner |
| 5,208,748 A | 5/1993 | Flores |
| 5,265,065 A | 11/1993 | Turtle |
| 5,274,560 A | 12/1993 | LaRue |
| 5,331,554 A | 7/1994 | Graham |
| 5,357,596 A | 10/1994 | Takebayashi |
| 5,369,575 A | 11/1994 | Lamberti |
| 5,377,350 A | 12/1994 | Skinner |
| 5,386,556 A | 1/1995 | Hedin |
| 5,424,947 A | 6/1995 | Nagao |
| 5,471,318 A | 11/1995 | Ahuja |
| 5,475,733 A | 12/1995 | Eisdorfer |
| 5,479,563 A | 12/1995 | Yamaguchi |
| 5,488,652 A | 1/1996 | Bielby |
| 5,499,289 A | 3/1996 | Bruno |
| 5,500,920 A | 3/1996 | Kupiec |
| 5,517,560 A | 5/1996 | Greenspan |
| 5,533,108 A | 7/1996 | Harris |
| 5,537,436 A | 7/1996 | Bottoms |
| 5,539,744 A | 7/1996 | Chu |
| 5,557,667 A | 9/1996 | Bruno |
| 5,559,864 A | 9/1996 | Kennedy, Jr. |
| 5,563,937 A | 10/1996 | Bruno |
| 5,577,165 A | 11/1996 | Takebayashi |
| 5,590,039 A | 12/1996 | Ikeda |
| 5,608,635 A | 3/1997 | Tamai |
| 5,615,296 A | 3/1997 | Stanford |
| 5,617,407 A | 4/1997 | Bareis |
| 5,633,922 A | 5/1997 | August |
| 5,634,086 A | 5/1997 | Rtischev |
| 5,652,570 A | 7/1997 | Lepkofker |
| 5,675,629 A | 10/1997 | Raffel |
| 5,696,965 A | 12/1997 | Dedrick |
| 5,708,422 A | 1/1998 | Blonder |
| 5,721,938 A | 2/1998 | Stuckey |
| 5,722,084 A | 2/1998 | Chakrin |
| 5,740,256 A | 4/1998 | CastelloDaCosta |
| 5,742,763 A | 4/1998 | Jones |
| 5,748,841 A | 5/1998 | Morin |
| 5,748,974 A | 5/1998 | Johnson |
| 5,752,052 A | 5/1998 | Richardson |
| 5,754,784 A | 5/1998 | Garland |
| 5,761,631 A | 6/1998 | Nasukawa |
| 5,774,841 A | 6/1998 | Salazar |
| 5,774,859 A | 6/1998 | Houser |
| 5,794,050 A | 8/1998 | Dahlgren |
| 5,794,196 A | 8/1998 | Yegnanarayanan |
| 5,797,112 A | 8/1998 | Komatsu |
| 5,799,276 A | 8/1998 | Komissarchik |
| 5,802,510 A | 9/1998 | Jones |
| 5,829,000 A | 10/1998 | Huang |
| 5,832,221 A | 11/1998 | Jones |
| 5,839,107 A | 11/1998 | Gupta |
| 5,848,396 A | 12/1998 | Gerace |
| 5,855,000 A | 12/1998 | Waibel |
| 5,867,817 A | 2/1999 | Catallo |
| 5,878,385 A | 3/1999 | Bralich |
| 5,878,386 A | 3/1999 | Coughlin |
| 5,892,813 A | 4/1999 | Morin |
| 5,892,900 A | 4/1999 | Ginter |
| 5,895,464 A | 4/1999 | Bhandari |
| 5,895,466 A | 4/1999 | Goldberg |
| 5,897,613 A | 4/1999 | Chan |
| 5,899,991 A | 5/1999 | Karch |
| 5,902,347 A | 5/1999 | Backman |
| 5,911,120 A | 6/1999 | Jarett |
| 5,918,222 A | 6/1999 | Fukui |
| 5,926,784 A | 7/1999 | Richardson |
| 5,933,822 A | 8/1999 | Braden-Harder |
| 5,950,167 A | 9/1999 | Yaker |
| 5,953,393 A | 9/1999 | Culbreth |
| 5,960,384 A | 9/1999 | Brash |
| 5,960,397 A | 9/1999 | Rahim |
| 5,960,399 A | 9/1999 | Barclay |
| 5,960,447 A | 9/1999 | Holt |
| 5,963,894 A | 10/1999 | Richardson |
| 5,963,940 A | 10/1999 | Liddy |
| 5,983,190 A | 11/1999 | Trower, II |
| 5,987,404 A | 11/1999 | DellaPietra |
| 5,991,721 A | 11/1999 | Asano |
| 5,995,119 A | 11/1999 | Cosatto |
| 5,995,928 A | 11/1999 | Nguyen |
| 5,995,943 A | 11/1999 | Bull |
| 6,009,382 A | 12/1999 | Martino |
| 6,014,559 A | 1/2000 | Amin |
| 6,018,708 A | 1/2000 | Dahan |
| 6,021,384 A | 2/2000 | Gorin |
| 6,028,514 A | 2/2000 | Lemelson |
| 6,035,267 A | 3/2000 | Watanabe |
| 6,044,347 A | 3/2000 | Abella |
| 6,049,602 A | 4/2000 | Foladare |
| 6,049,607 A | 4/2000 | Marash |
| 6,058,187 A | 5/2000 | Chen |
| 6,067,513 A | 5/2000 | Ishimitsu |
| 6,073,098 A | 6/2000 | Buchsbaum |
| 6,076,059 A | 6/2000 | Glickman |
| 6,078,886 A | 6/2000 | Dragosh |
| 6,081,774 A | 6/2000 | deHita |
| 6,085,186 A | 7/2000 | Christianson |
| 6,101,241 A | 8/2000 | Boyce |
| 6,108,631 A | 8/2000 | Ruhl |
| 6,119,087 A | 9/2000 | Kuhn |
| 6,119,101 A | 9/2000 | Peckover |
| 6,122,613 A | 9/2000 | Baker |
| 6,134,235 A | 10/2000 | Goldman |
| 6,144,667 A | 11/2000 | Doshi |
| 6,144,938 A | 11/2000 | Surace |
| 6,154,526 A | 11/2000 | Dahlke |
| 6,160,883 A | 12/2000 | Jackson |
| 6,167,377 A | 12/2000 | Gillick |
| 6,173,266 B1 | 1/2001 | Marx |
| 6,173,279 B1 | 1/2001 | Levin |
| 6,175,858 B1 | 1/2001 | Bulfer |
| 6,185,535 B1 | 2/2001 | Hedin |
| 6,188,982 B1 | 2/2001 | Chiang |
| 6,192,110 B1 | 2/2001 | Abella |
| 6,192,338 B1 | 2/2001 | Haszto |
| 6,195,634 B1 | 2/2001 | Dudemaine |
| 6,195,651 B1 | 2/2001 | Handel |
| 6,199,043 B1 | 3/2001 | Happ |
| 6,208,964 B1 | 3/2001 | Sabourin |
| 6,208,972 B1 | 3/2001 | Grant |
| 6,219,346 B1 | 4/2001 | Maxemchuk |
| 6,219,643 B1 | 4/2001 | Cohen |
| 6,219,645 B1 | 4/2001 | Byers |
| 6,226,612 B1 | 5/2001 | Srenger |
| 6,233,556 B1 | 5/2001 | Teunen |
| 6,233,559 B1 | 5/2001 | Balakrishnan |
| 6,233,561 B1 | 5/2001 | Junqua |
| 6,236,968 B1 | 5/2001 | Kanevsky |
| 6,243,679 B1 | 6/2001 | Mohri |
| 6,246,981 B1 | 6/2001 | Papineni |
| 6,246,990 B1 | 6/2001 | Happ |
| 6,266,636 B1 | 7/2001 | Kosaka |
| 6,269,336 B1 | 7/2001 | Ladd |
| 6,272,455 B1 | 8/2001 | Hoshen |
| 6,272,461 B1 | 8/2001 | Meredith |

(56) References Cited

U.S. PATENT DOCUMENTS

| | | |
|---|---|---|
| 6,275,231 B1 | 8/2001 | Obradovich |
| 6,278,377 B1 | 8/2001 | DeLine |
| 6,278,968 B1 | 8/2001 | Franz |
| 6,286,002 B1 | 9/2001 | Axaopoulos |
| 6,288,319 B1 | 9/2001 | Catona |
| 6,292,767 B1 | 9/2001 | Jackson |
| 6,301,560 B1 | 10/2001 | Masters |
| 6,308,151 B1 | 10/2001 | Smith |
| 6,311,159 B1 | 10/2001 | VanTichelen |
| 6,314,402 B1 | 11/2001 | Monaco |
| 6,321,196 B1 | 11/2001 | Franceschi |
| 6,356,869 B1 | 3/2002 | Chapados |
| 6,362,748 B1 | 3/2002 | Huang |
| 6,366,882 B1 | 4/2002 | Bijl |
| 6,366,886 B1 | 4/2002 | Dragosh |
| 6,374,214 B1 | 4/2002 | Friedland |
| 6,374,226 B1 | 4/2002 | Hunt |
| 6,377,913 B1 | 4/2002 | Coffman |
| 6,381,535 B1 | 4/2002 | Durocher |
| 6,385,596 B1 | 5/2002 | Wiser |
| 6,385,646 B1 | 5/2002 | Brown |
| 6,389,398 B1 | 5/2002 | Lustgarten |
| 6,393,403 B1 | 5/2002 | Majaniemi |
| 6,393,428 B1 | 5/2002 | Miller |
| 6,397,181 B1 | 5/2002 | Li |
| 6,404,878 B1 | 6/2002 | Jackson |
| 6,405,170 B1 | 6/2002 | Phillips |
| 6,408,272 B1 | 6/2002 | White |
| 6,411,810 B1 | 6/2002 | Maxemchuk |
| 6,411,893 B2 | 6/2002 | Ruhl |
| 6,415,257 B1 | 7/2002 | Junqua |
| 6,418,210 B1 | 7/2002 | Sayko |
| 6,420,975 B1 | 7/2002 | DeLine |
| 6,429,813 B2 | 8/2002 | Feigen |
| 6,430,285 B1 | 8/2002 | Bauer |
| 6,430,531 B1 | 8/2002 | Polish |
| 6,434,523 B1 | 8/2002 | Monaco |
| 6,434,524 B1 | 8/2002 | Weber |
| 6,434,529 B1 | 8/2002 | Walker |
| 6,442,522 B1 | 8/2002 | Carberry |
| 6,446,114 B1 | 9/2002 | Bulfer |
| 6,453,153 B1 | 9/2002 | Bowker |
| 6,453,292 B2 | 9/2002 | Ramaswamy |
| 6,456,711 B1 | 9/2002 | Cheung |
| 6,456,974 B1 | 9/2002 | Baker |
| 6,466,654 B1 | 10/2002 | Cooper |
| 6,466,899 B1 | 10/2002 | Yano |
| 6,470,315 B1 | 10/2002 | Netsch |
| 6,487,494 B2 | 11/2002 | Odinak |
| 6,487,495 B1 | 11/2002 | Gale |
| 6,498,797 B1 | 12/2002 | Anerousis |
| 6,499,013 B1 | 12/2002 | Weber |
| 6,501,833 B2 | 12/2002 | Phillips |
| 6,501,834 B1 | 12/2002 | Milewski |
| 6,505,155 B1 | 1/2003 | Vanbuskirk |
| 6,510,417 B1 | 1/2003 | Woods |
| 6,513,006 B2 | 1/2003 | Howard |
| 6,522,746 B1 | 2/2003 | Marchok |
| 6,523,061 B1 | 2/2003 | Halverson |
| 6,532,444 B1 | 3/2003 | Weber |
| 6,539,348 B1 | 3/2003 | Bond |
| 6,549,629 B2 | 4/2003 | Finn |
| 6,553,372 B1 | 4/2003 | Brassell |
| 6,556,970 B1 | 4/2003 | Sasaki |
| 6,556,973 B1 | 4/2003 | Lewin |
| 6,560,576 B1 | 5/2003 | Cohen |
| 6,560,590 B1 | 5/2003 | Shwe |
| 6,567,778 B1 | 5/2003 | ChaoChang |
| 6,567,797 B1 | 5/2003 | Schuetze |
| 6,567,805 B1 | 5/2003 | Johnson |
| 6,570,555 B1 | 5/2003 | Prevost |
| 6,570,964 B1 | 5/2003 | Murveit |
| 6,571,279 B1 | 5/2003 | Herz |
| 6,574,597 B1 | 6/2003 | Mohri |
| 6,574,624 B1 | 6/2003 | Johnson |
| 6,578,022 B1 | 6/2003 | Foulger |
| 6,581,103 B1 | 6/2003 | Dengler |
| 6,584,439 B1 | 6/2003 | Geilhufe |
| 6,587,858 B1 | 7/2003 | Strazza |
| 6,591,185 B1 | 7/2003 | Polidi |
| 6,591,239 B1 | 7/2003 | McCall |
| 6,594,257 B1 | 7/2003 | Doshi |
| 6,594,367 B1 | 7/2003 | Marash |
| 6,598,018 B1 | 7/2003 | Junqua |
| 6,601,026 B2 | 7/2003 | Appelt |
| 6,601,029 B1 | 7/2003 | Pickering |
| 6,604,075 B1 | 8/2003 | Brown |
| 6,604,077 B2 | 8/2003 | Dragosh |
| 6,606,598 B1 | 8/2003 | Holthouse |
| 6,611,692 B2 | 8/2003 | Raffel |
| 6,614,773 B1 | 9/2003 | Maxemchuk |
| 6,615,172 B1 | 9/2003 | Bennett |
| 6,622,119 B1 | 9/2003 | Ramaswamy |
| 6,629,066 B1 | 9/2003 | Jackson |
| 6,631,346 B1 | 10/2003 | Karaorman |
| 6,631,351 B1 | 10/2003 | Ramachandran |
| 6,633,846 B1 | 10/2003 | Bennett |
| 6,636,790 B1 | 10/2003 | Lightner |
| 6,643,620 B1 | 11/2003 | Contolini |
| 6,647,363 B2 | 11/2003 | Claassen |
| 6,650,747 B1 | 11/2003 | Bala |
| 6,658,388 B1 | 12/2003 | Kleindienst |
| 6,678,680 B1 | 1/2004 | Woo |
| 6,681,206 B1 | 1/2004 | Gorin |
| 6,691,151 B1 | 2/2004 | Cheyer |
| 6,701,294 B1 | 3/2004 | Ball |
| 6,704,396 B2 | 3/2004 | Parolkar |
| 6,704,576 B1 | 3/2004 | Brachman |
| 6,704,708 B1 | 3/2004 | Pickering |
| 6,707,421 B1 | 3/2004 | Drury |
| 6,708,150 B1 | 3/2004 | Hirayama |
| 6,721,001 B1 | 4/2004 | Berstis |
| 6,721,633 B2 | 4/2004 | Funk |
| 6,721,706 B1 | 4/2004 | Strubbe |
| 6,726,636 B2 | 4/2004 | DerGhazarian |
| 6,732,088 B1 | 5/2004 | Glance |
| 6,735,592 B1 | 5/2004 | Neumann |
| 6,739,556 B1 | 5/2004 | Langston |
| 6,741,931 B1 | 5/2004 | Kohut |
| 6,742,021 B1 | 5/2004 | Halverson |
| 6,745,161 B1 | 6/2004 | Arnold |
| 6,751,591 B1 | 6/2004 | Gorin |
| 6,751,612 B1 | 6/2004 | Schuetze |
| 6,754,485 B1 | 6/2004 | Obradovich |
| 6,754,627 B2 | 6/2004 | Woodward |
| 6,754,647 B1 | 6/2004 | Tackett |
| 6,757,544 B2 | 6/2004 | Rangarajan |
| 6,757,718 B1 | 6/2004 | Halverson |
| 6,785,651 B1 | 8/2004 | Wang |
| 6,795,808 B1 | 9/2004 | Strubbe |
| 6,801,604 B2 | 10/2004 | Maes |
| 6,801,893 B1 | 10/2004 | Backfried |
| 6,804,330 B1 | 10/2004 | Jones |
| 6,810,375 B1 | 10/2004 | Ejerhed |
| 6,813,341 B1 | 11/2004 | Mahoney |
| 6,816,830 B1 | 11/2004 | Kempe |
| 6,829,603 B1 | 12/2004 | Chai |
| 6,832,230 B1 | 12/2004 | Zilliacus |
| 6,833,848 B1 | 12/2004 | Wolff |
| 6,850,603 B1 | 2/2005 | Eberle |
| 6,856,990 B2 | 2/2005 | Barile |
| 6,865,481 B2 | 3/2005 | Kawazoe |
| 6,868,380 B2 | 3/2005 | Kroeker |
| 6,868,385 B1 | 3/2005 | Gerson |
| 6,871,179 B1 | 3/2005 | Kist |
| 6,873,837 B1 | 3/2005 | Yoshioka |
| 6,877,001 B1 | 4/2005 | Wolf |
| 6,877,134 B1 | 4/2005 | Fuller |
| 6,882,970 B1 | 4/2005 | Garner |
| 6,901,366 B1 | 5/2005 | Kuhn |
| 6,910,003 B1 | 6/2005 | Arnold |
| 6,912,498 B2 | 6/2005 | Stevens |
| 6,915,126 B2 | 7/2005 | Mazzara, Jr. |
| 6,928,614 B1 | 8/2005 | Everhart |

(56) References Cited

U.S. PATENT DOCUMENTS

| | | |
|---|---|---|
| 6,934,756 B2 | 8/2005 | Maes |
| 6,937,977 B2 | 8/2005 | Gerson |
| 6,937,982 B2 | 8/2005 | Kitaoka |
| 6,941,266 B1 | 9/2005 | Gorin |
| 6,944,594 B2 | 9/2005 | Busayapongchai |
| 6,950,821 B2 | 9/2005 | Faybishenko |
| 6,954,755 B2 | 10/2005 | Reisman |
| 6,959,276 B2 | 10/2005 | Droppo |
| 6,961,700 B2 | 11/2005 | Mitchell |
| 6,963,759 B1 | 11/2005 | Gerson |
| 6,964,023 B2 | 11/2005 | Maes |
| 6,968,311 B2 | 11/2005 | Knockeart |
| 6,973,387 B2 | 12/2005 | Masclet |
| 6,975,993 B1 | 12/2005 | Keiller |
| 6,980,092 B2 | 12/2005 | Turnbull |
| 6,983,055 B2 | 1/2006 | Luo |
| 6,990,513 B2 | 1/2006 | Belfiore |
| 6,996,531 B2 | 2/2006 | Korall |
| 7,003,463 B1 | 2/2006 | Maes |
| 7,016,849 B2 | 3/2006 | Arnold |
| 7,020,609 B2 | 3/2006 | Thrift |
| 7,024,364 B2 | 4/2006 | Guerra |
| 7,027,586 B2 | 4/2006 | Bushey |
| 7,027,974 B1 | 4/2006 | Busch |
| 7,027,975 B1 | 4/2006 | Pazandak |
| 7,035,415 B2 | 4/2006 | Belt |
| 7,036,128 B1 | 4/2006 | Julia |
| 7,043,425 B2 | 5/2006 | Pao |
| 7,054,817 B2 | 5/2006 | Shao |
| 7,058,890 B2 | 6/2006 | George |
| 7,062,488 B1 | 6/2006 | Reisman |
| 7,069,220 B2 | 6/2006 | Coffman |
| 7,072,834 B2 | 7/2006 | Zhou |
| 7,072,888 B1 | 7/2006 | Perkins |
| 7,076,362 B2 | 7/2006 | Ohtsuji |
| 7,082,469 B2 | 7/2006 | Gold |
| 7,085,708 B2 | 8/2006 | Manson |
| 7,092,928 B1 | 8/2006 | Elad |
| 7,107,210 B2 | 9/2006 | Deng |
| 7,107,218 B1 | 9/2006 | Preston |
| 7,110,951 B1 | 9/2006 | Lemelson |
| 7,127,395 B1 | 10/2006 | Gorin |
| 7,127,400 B2 | 10/2006 | Koch |
| 7,130,390 B2 | 10/2006 | Abburi |
| 7,136,875 B2 | 11/2006 | Anderson |
| 7,137,126 B1 | 11/2006 | Coffman |
| 7,143,037 B1 | 11/2006 | Chestnut |
| 7,143,039 B1 | 11/2006 | Stifelman |
| 7,146,319 B2 | 12/2006 | Hunt |
| 7,149,696 B2 | 12/2006 | Shimizu |
| 7,165,028 B2 | 1/2007 | Gong |
| 7,170,993 B2 | 1/2007 | Anderson |
| 7,171,291 B2 | 1/2007 | Obradovich |
| 7,174,300 B2 | 2/2007 | Bush |
| 7,177,798 B2 | 2/2007 | Hsu |
| 7,184,957 B2 | 2/2007 | Brookes |
| 7,190,770 B2 | 3/2007 | Ando |
| 7,197,069 B2 | 3/2007 | Agazzi |
| 7,197,460 B1 | 3/2007 | Gupta |
| 7,203,644 B2 | 4/2007 | Anderson |
| 7,206,418 B2 | 4/2007 | Yang |
| 7,207,011 B2 | 4/2007 | Mulvey |
| 7,215,941 B2 | 5/2007 | Beckmann |
| 7,228,276 B2 | 6/2007 | Omote |
| 7,231,343 B1 | 6/2007 | Treadgold |
| 7,236,923 B1 | 6/2007 | Gupta |
| 7,254,482 B2 | 8/2007 | Kawasaki |
| 7,272,212 B2 | 9/2007 | Eberle |
| 7,277,854 B2 | 10/2007 | Bennett |
| 7,283,829 B2 | 10/2007 | Christenson |
| 7,283,951 B2 | 10/2007 | Marchisio |
| 7,289,606 B2 | 10/2007 | Sibal |
| 7,299,186 B2 | 11/2007 | Kuzunuki |
| 7,301,093 B1 | 11/2007 | Sater |
| 7,305,381 B1 | 12/2007 | Poppink |
| 7,321,850 B2 | 1/2008 | Wakita |
| 7,328,155 B2 | 2/2008 | Endo |
| 7,337,116 B2 | 2/2008 | Charlesworth |
| 7,340,040 B1 | 3/2008 | Saylor |
| 7,366,285 B2 | 4/2008 | Parolkar |
| 7,366,669 B2 | 4/2008 | Nishitani |
| 7,376,645 B2 | 5/2008 | Bernard |
| 7,386,443 B1 | 6/2008 | Parthasarathy |
| 7,398,209 B2 | 7/2008 | Kennewick |
| 7,406,421 B2 | 7/2008 | Odinak |
| 7,415,100 B2 | 8/2008 | Cooper |
| 7,415,414 B2 | 8/2008 | Azara |
| 7,421,393 B1 | 9/2008 | DiFabbrizio |
| 7,424,431 B2 | 9/2008 | Greene |
| 7,447,635 B1 | 11/2008 | Konopka |
| 7,451,088 B1 | 11/2008 | Ehlen |
| 7,454,368 B2 | 11/2008 | Stillman |
| 7,454,608 B2 | 11/2008 | Gopalakrishnan |
| 7,461,059 B2 | 12/2008 | Richardson |
| 7,472,020 B2 | 12/2008 | Brulle-Drews |
| 7,472,060 B1 | 12/2008 | Gorin |
| 7,472,075 B2 | 12/2008 | Odinak |
| 7,477,909 B2 | 1/2009 | Roth |
| 7,478,036 B2 | 1/2009 | Shen |
| 7,487,088 B1 | 2/2009 | Gorin |
| 7,487,110 B2 | 2/2009 | Bennett |
| 7,493,259 B2 | 2/2009 | Jones |
| 7,493,559 B1 | 2/2009 | Wolff |
| 7,502,672 B1 | 3/2009 | Kolls |
| 7,502,730 B2 * | 3/2009 | Wang .................... G06F 17/278 |
| | | 704/9 |
| 7,502,738 B2 | 3/2009 | Kennewick |
| 7,516,076 B2 | 4/2009 | Walker |
| 7,529,675 B2 | 5/2009 | Maes |
| 7,536,297 B2 | 5/2009 | Byrd |
| 7,536,374 B2 | 5/2009 | Au |
| 7,542,894 B2 | 6/2009 | Murata |
| 7,546,382 B2 | 6/2009 | Healey |
| 7,548,491 B2 | 6/2009 | Macfarlane |
| 7,552,054 B1 | 6/2009 | Stifelman |
| 7,558,730 B2 | 7/2009 | Davis |
| 7,574,362 B2 | 8/2009 | Walker |
| 7,577,244 B2 | 8/2009 | Taschereau |
| 7,606,708 B2 | 10/2009 | Hwang |
| 7,606,712 B1 | 10/2009 | Smith |
| 7,620,549 B2 | 11/2009 | DiCristo |
| 7,634,409 B2 | 12/2009 | Kennewick |
| 7,640,006 B2 | 12/2009 | Portman |
| 7,640,160 B2 * | 12/2009 | Di Cristo ............. G06F 17/279 |
| | | 704/257 |
| 7,640,272 B2 | 12/2009 | Mahajan |
| 7,672,931 B2 | 3/2010 | Hurst-Hiller |
| 7,676,365 B2 | 3/2010 | Hwang |
| 7,676,369 B2 | 3/2010 | Fujimoto |
| 7,684,977 B2 | 3/2010 | Morikawa |
| 7,693,720 B2 | 4/2010 | Kennewick |
| 7,697,673 B2 | 4/2010 | Chiu |
| 7,706,616 B2 | 4/2010 | Kristensson |
| 7,729,916 B2 | 6/2010 | Coffman |
| 7,729,918 B2 | 6/2010 | Walker |
| 7,729,920 B2 | 6/2010 | Chaar |
| 7,734,287 B2 | 6/2010 | Ying |
| 7,748,021 B2 | 6/2010 | Obradovich |
| 7,788,084 B2 | 8/2010 | Brun |
| 7,792,257 B1 | 9/2010 | Vanier |
| 7,801,731 B2 | 9/2010 | Odinak |
| 7,809,570 B2 | 10/2010 | Kennewick |
| 7,818,176 B2 | 10/2010 | Freeman |
| 7,831,426 B2 | 11/2010 | Bennett |
| 7,831,433 B1 | 11/2010 | Belvin |
| 7,856,358 B2 | 12/2010 | Ho |
| 7,873,519 B2 | 1/2011 | Bennett |
| 7,873,523 B2 | 1/2011 | Potter |
| 7,873,654 B2 | 1/2011 | Bernard |
| 7,881,936 B2 | 2/2011 | Longe |
| 7,890,324 B2 | 2/2011 | Bangalore |
| 7,894,849 B2 | 2/2011 | Kass |
| 7,902,969 B2 | 3/2011 | Obradovich |
| 7,917,367 B2 | 3/2011 | DiCristo |

(56) References Cited

U.S. PATENT DOCUMENTS

| | | |
|---|---|---|
| 7,920,682 B2 | 4/2011 | Byrne |
| 7,949,529 B2 | 5/2011 | Weider |
| 7,949,537 B2 | 5/2011 | Walker |
| 7,953,732 B2 | 5/2011 | Frank |
| 7,974,875 B1 | 7/2011 | Quilici |
| 7,983,917 B2 | 7/2011 | Kennewick |
| 7,984,287 B2 | 7/2011 | Gopalakrishnan |
| 8,005,683 B2 | 8/2011 | Tessel |
| 8,015,006 B2 | 9/2011 | Kennewick |
| 8,024,186 B1 | 9/2011 | De Bonet |
| 8,027,965 B2 | 9/2011 | Takehara |
| 8,032,383 B1 | 10/2011 | Bhardwaj |
| 8,060,367 B2 | 11/2011 | Keaveney |
| 8,069,046 B2 | 11/2011 | Kennewick |
| 8,073,681 B2 | 12/2011 | Baldwin |
| 8,077,975 B2 | 12/2011 | Ma |
| 8,082,153 B2 | 12/2011 | Coffman |
| 8,086,463 B2 | 12/2011 | Ativanichayaphong |
| 8,103,510 B2 | 1/2012 | Sato |
| 8,112,275 B2 | 2/2012 | Kennewick |
| 8,140,327 B2 | 3/2012 | Kennewick |
| 8,140,335 B2 | 3/2012 | Kennewick |
| 8,145,489 B2 | 3/2012 | Freeman |
| 8,150,694 B2 | 4/2012 | Kennewick |
| 8,155,962 B2 | 4/2012 | Kennewick |
| 8,170,867 B2 | 5/2012 | Germain |
| 8,180,037 B1 | 5/2012 | Delker |
| 8,195,468 B2 | 6/2012 | Weider |
| 8,200,485 B1 | 6/2012 | Lee |
| 8,204,751 B1 | 6/2012 | Di Fabbrizio |
| 8,219,399 B2 | 7/2012 | Lutz |
| 8,219,599 B2 | 7/2012 | Tunstall-Pedoe |
| 8,224,652 B2 | 7/2012 | Wang |
| 8,255,224 B2 | 8/2012 | Singleton |
| 8,326,599 B2 | 12/2012 | Tomeh |
| 8,326,627 B2 | 12/2012 | Kennewick |
| 8,326,634 B2 | 12/2012 | DiCristo |
| 8,326,637 B2 | 12/2012 | Baldwin |
| 8,332,224 B2 | 12/2012 | DiCristo |
| 8,340,975 B1 | 12/2012 | Rosenberger |
| 8,346,563 B1 | 1/2013 | Hjelm |
| 8,370,147 B2 | 2/2013 | Kennewick |
| 8,447,607 B2 | 5/2013 | Weider |
| 8,447,651 B1 | 5/2013 | Scholl |
| 8,452,598 B2 | 5/2013 | Kennewick |
| 8,503,995 B2 | 8/2013 | Ramer |
| 8,509,403 B2 | 8/2013 | Chiu |
| 8,515,765 B2 | 8/2013 | Baldwin |
| 8,527,274 B2 | 9/2013 | Freeman |
| 8,577,671 B1 | 11/2013 | Barve |
| 8,589,161 B2 | 11/2013 | Kennewick |
| 8,612,205 B2 | 12/2013 | Hanneman |
| 8,612,206 B2 | 12/2013 | Chalabi |
| 8,620,659 B2 | 12/2013 | DiCristo |
| 8,719,005 B1 | 5/2014 | Lee |
| 8,719,009 B2 | 5/2014 | Baldwin |
| 8,719,026 B2 | 5/2014 | Kennewick |
| 8,731,929 B2 | 5/2014 | Kennewick |
| 8,738,380 B2 | 5/2014 | Baldwin |
| 8,849,652 B2 | 9/2014 | Weider |
| 8,849,670 B2 | 9/2014 | DiCristo |
| 8,849,696 B2 | 9/2014 | Pansari |
| 8,849,791 B1 | 9/2014 | Hertschuh |
| 8,886,536 B2 | 11/2014 | Freeman |
| 8,972,243 B1 | 3/2015 | Strom |
| 8,983,839 B2 | 3/2015 | Kennewick |
| 9,009,046 B1 | 4/2015 | Stewart |
| 9,015,049 B2 | 4/2015 | Baldwin |
| 9,037,455 B1 | 5/2015 | Faaborg |
| 9,070,366 B1 | 6/2015 | Mathias |
| 9,070,367 B1 | 6/2015 | Hoffmeister |
| 9,105,266 B2 | 8/2015 | Baldwin |
| 9,171,541 B2 | 10/2015 | Kennewick |
| 9,269,097 B2 | 2/2016 | Freeman |
| 9,305,548 B2 | 4/2016 | Kennewick |
| 9,308,445 B1 | 4/2016 | Merzenich |
| 9,318,108 B2 * | 4/2016 | Gruber ............... G10L 15/1815 |
| 9,406,078 B2 | 8/2016 | Freeman |
| 9,443,514 B1 | 9/2016 | Taubman |
| 9,502,025 B2 | 11/2016 | Kennewick |
| 2001/0039492 A1 | 11/2001 | Nemoto |
| 2001/0041980 A1 | 11/2001 | Howard |
| 2001/0047261 A1 | 11/2001 | Kassan |
| 2001/0049601 A1 | 12/2001 | Kroeker |
| 2001/0054087 A1 | 12/2001 | Flom |
| 2002/0002548 A1 | 1/2002 | Roundtree |
| 2002/0007267 A1 | 1/2002 | Batchilo |
| 2002/0010584 A1 | 1/2002 | Schultz |
| 2002/0015500 A1 | 2/2002 | Belt |
| 2002/0022927 A1 | 2/2002 | Lemelson |
| 2002/0022956 A1 | 2/2002 | Ukrainczyk |
| 2002/0029186 A1 | 3/2002 | Roth |
| 2002/0029261 A1 | 3/2002 | Shibata |
| 2002/0032752 A1 | 3/2002 | Gold |
| 2002/0035501 A1 | 3/2002 | Handel |
| 2002/0040297 A1 | 4/2002 | Tsiao |
| 2002/0049535 A1 | 4/2002 | Rigo |
| 2002/0049805 A1 | 4/2002 | Yamada |
| 2002/0059068 A1 | 5/2002 | Rose |
| 2002/0065568 A1 | 5/2002 | Silfvast |
| 2002/0067839 A1 | 6/2002 | Heinrich |
| 2002/0069059 A1 | 6/2002 | Smith |
| 2002/0069071 A1 | 6/2002 | Knockeart |
| 2002/0073176 A1 | 6/2002 | Ikeda |
| 2002/0082911 A1 | 6/2002 | Dunn |
| 2002/0087312 A1 | 7/2002 | Lee |
| 2002/0087326 A1 | 7/2002 | Lee |
| 2002/0087525 A1 | 7/2002 | Abbott |
| 2002/0107694 A1 | 8/2002 | Lerg |
| 2002/0120609 A1 | 8/2002 | Lang |
| 2002/0124050 A1 | 9/2002 | Middeljans |
| 2002/0133347 A1 | 9/2002 | Schoneburg |
| 2002/0133354 A1 | 9/2002 | Ross |
| 2002/0133402 A1 | 9/2002 | Faber |
| 2002/0135618 A1 | 9/2002 | Maes |
| 2002/0138248 A1 | 9/2002 | Corston-Oliver |
| 2002/0143532 A1 | 10/2002 | McLean |
| 2002/0143535 A1 | 10/2002 | Kist |
| 2002/0152260 A1 | 10/2002 | Chen |
| 2002/0161646 A1 | 10/2002 | Gailey |
| 2002/0161647 A1 | 10/2002 | Gailey |
| 2002/0169597 A1 | 11/2002 | Fain |
| 2002/0173333 A1 | 11/2002 | Buchholz |
| 2002/0173961 A1 | 11/2002 | Guerra |
| 2002/0184373 A1 | 12/2002 | Maes |
| 2002/0188602 A1 | 12/2002 | Stubler |
| 2002/0198714 A1 | 12/2002 | Zhou |
| 2003/0005033 A1 | 1/2003 | Mohan |
| 2003/0014261 A1 | 1/2003 | Kageyama |
| 2003/0016835 A1 | 1/2003 | Elko |
| 2003/0036903 A1 | 2/2003 | Konopka |
| 2003/0046071 A1 | 3/2003 | Wyman |
| 2003/0046281 A1 | 3/2003 | Son |
| 2003/0046346 A1 | 3/2003 | Mumick |
| 2003/0064709 A1 | 4/2003 | Gailey |
| 2003/0065427 A1 | 4/2003 | Funk |
| 2003/0069734 A1 | 4/2003 | Everhart |
| 2003/0069880 A1 | 4/2003 | Harrison |
| 2003/0088421 A1 | 5/2003 | Maes |
| 2003/0093419 A1 | 5/2003 | Bangalore |
| 2003/0097249 A1 | 5/2003 | Walker |
| 2003/0110037 A1 | 6/2003 | Walker |
| 2003/0112267 A1 | 6/2003 | Belrose |
| 2003/0115062 A1 | 6/2003 | Walker |
| 2003/0120493 A1 | 6/2003 | Gupta |
| 2003/0135488 A1 | 7/2003 | Amir |
| 2003/0144846 A1 | 7/2003 | Denenberg |
| 2003/0158731 A1 | 8/2003 | Falcon |
| 2003/0161448 A1 | 8/2003 | Parolkar |
| 2003/0167167 A1 | 9/2003 | Gong |
| 2003/0174155 A1 | 9/2003 | Weng |
| 2003/0182132 A1 | 9/2003 | Niemoeller |
| 2003/0187643 A1 | 10/2003 | VanThong |
| 2003/0204492 A1 | 10/2003 | Wolf |

(56) References Cited

U.S. PATENT DOCUMENTS

| | | |
|---|---|---|
| 2003/0206640 A1 | 11/2003 | Malvar |
| 2003/0212550 A1 | 11/2003 | Ubale |
| 2003/0212558 A1 | 11/2003 | Matula |
| 2003/0212562 A1 | 11/2003 | Patel |
| 2003/0225825 A1 | 12/2003 | Healey |
| 2003/0233230 A1 | 12/2003 | Ammicht |
| 2003/0236664 A1 | 12/2003 | Sharma |
| 2004/0006475 A1 | 1/2004 | Ehlen |
| 2004/0010358 A1 | 1/2004 | Oesterling |
| 2004/0025115 A1 | 2/2004 | Sienel |
| 2004/0030741 A1 | 2/2004 | Wolton |
| 2004/0036601 A1 | 2/2004 | Obradovich |
| 2004/0044516 A1 | 3/2004 | Kennewick |
| 2004/0093567 A1 | 5/2004 | Schabes |
| 2004/0098245 A1 | 5/2004 | Walker |
| 2004/0117179 A1 | 6/2004 | Balasuriya |
| 2004/0117804 A1 | 6/2004 | Scahill |
| 2004/0122673 A1 | 6/2004 | Park |
| 2004/0122674 A1 | 6/2004 | Bangalore |
| 2004/0133793 A1 | 7/2004 | Ginter |
| 2004/0140989 A1 | 7/2004 | Papageorge |
| 2004/0143440 A1 | 7/2004 | Prasad |
| 2004/0148154 A1 | 7/2004 | Acero |
| 2004/0148170 A1 | 7/2004 | Acero |
| 2004/0158555 A1 | 8/2004 | Seedman |
| 2004/0166832 A1 | 8/2004 | Portman |
| 2004/0167771 A1 | 8/2004 | Duan |
| 2004/0172247 A1 | 9/2004 | Yoon |
| 2004/0172258 A1 | 9/2004 | Dominach |
| 2004/0189697 A1 | 9/2004 | Fukuoka |
| 2004/0193408 A1 | 9/2004 | Hunt |
| 2004/0193420 A1 | 9/2004 | Kennewick |
| 2004/0199375 A1 | 10/2004 | Ehsani |
| 2004/0199389 A1 | 10/2004 | Geiger |
| 2004/0201607 A1 | 10/2004 | Mulvey |
| 2004/0205671 A1 | 10/2004 | Sukehiro |
| 2004/0243393 A1 | 12/2004 | Wang |
| 2004/0243417 A9 | 12/2004 | Pitts |
| 2004/0247092 A1 | 12/2004 | Timmins |
| 2004/0249636 A1 | 12/2004 | Applebaum |
| 2005/0015256 A1 | 1/2005 | Kargman |
| 2005/0021331 A1 | 1/2005 | Huang |
| 2005/0021334 A1 | 1/2005 | Iwahashi |
| 2005/0021470 A1 | 1/2005 | Martin |
| 2005/0021826 A1 | 1/2005 | Kumar |
| 2005/0033574 A1 | 2/2005 | Kim |
| 2005/0033582 A1 | 2/2005 | Gadd |
| 2005/0043940 A1 | 2/2005 | Elder |
| 2005/0080632 A1 | 4/2005 | Endo |
| 2005/0102282 A1 | 5/2005 | Linden |
| 2005/0114116 A1 | 5/2005 | Fiedler |
| 2005/0125232 A1 | 6/2005 | Gadd |
| 2005/0131673 A1 | 6/2005 | Koizumi |
| 2005/0137850 A1 | 6/2005 | Odell |
| 2005/0137877 A1 | 6/2005 | Oesterling |
| 2005/0143994 A1 | 6/2005 | Mori |
| 2005/0144013 A1 | 6/2005 | Fujimoto |
| 2005/0144187 A1 | 6/2005 | Che |
| 2005/0149319 A1 | 7/2005 | Honda |
| 2005/0216254 A1 | 9/2005 | Gupta |
| 2005/0222763 A1 | 10/2005 | Uyeki |
| 2005/0234637 A1 | 10/2005 | Obradovich |
| 2005/0234727 A1 | 10/2005 | Chiu |
| 2005/0246174 A1 | 11/2005 | DeGolia |
| 2005/0283364 A1 | 12/2005 | Longe |
| 2005/0283532 A1 | 12/2005 | Kim |
| 2005/0283752 A1 | 12/2005 | Fruchter |
| 2006/0041431 A1 | 2/2006 | Maes |
| 2006/0046740 A1 | 3/2006 | Johnson |
| 2006/0047509 A1 | 3/2006 | Ding |
| 2006/0072738 A1 | 4/2006 | Louis |
| 2006/0074670 A1 | 4/2006 | Weng |
| 2006/0074671 A1 | 4/2006 | Farmaner |
| 2006/0080098 A1 | 4/2006 | Campbell |
| 2006/0100851 A1 | 5/2006 | Schonebeck |
| 2006/0106769 A1 | 5/2006 | Gibbs |
| 2006/0129409 A1 | 6/2006 | Mizutani |
| 2006/0130002 A1 | 6/2006 | Hirayama |
| 2006/0182085 A1 | 8/2006 | Sweeney |
| 2006/0206310 A1 | 9/2006 | Ravikumar |
| 2006/0217133 A1 | 9/2006 | Christenson |
| 2006/0236343 A1 | 10/2006 | Chang |
| 2006/0242017 A1 | 10/2006 | Libes |
| 2006/0253247 A1 | 11/2006 | de Silva |
| 2006/0253281 A1 | 11/2006 | Letzt |
| 2006/0285662 A1 | 12/2006 | Yin |
| 2007/0011159 A1 | 1/2007 | Hillis |
| 2007/0033005 A1 | 2/2007 | Di Cristo |
| 2007/0033020 A1 | 2/2007 | Francois |
| 2007/0033526 A1 | 2/2007 | Thompson |
| 2007/0038436 A1 | 2/2007 | Cristo |
| 2007/0038445 A1 | 2/2007 | Helbing |
| 2007/0043569 A1 | 2/2007 | Potter |
| 2007/0043574 A1 | 2/2007 | Coffman |
| 2007/0043868 A1 | 2/2007 | Kumar |
| 2007/0050191 A1 | 3/2007 | Weider |
| 2007/0050279 A1 | 3/2007 | Huang |
| 2007/0055525 A1 | 3/2007 | Kennewick |
| 2007/0061067 A1 | 3/2007 | Zeinstra |
| 2007/0061735 A1 | 3/2007 | Hoffberg |
| 2007/0073544 A1 | 3/2007 | Millett |
| 2007/0078708 A1 | 4/2007 | Yu |
| 2007/0078709 A1 | 4/2007 | Rajaram |
| 2007/0078814 A1 | 4/2007 | Flowers |
| 2007/0094003 A1 | 4/2007 | Huang |
| 2007/0100797 A1 | 5/2007 | Thun |
| 2007/0112555 A1 | 5/2007 | Lavi |
| 2007/0112630 A1 | 5/2007 | Lau |
| 2007/0118357 A1 | 5/2007 | Kasravi |
| 2007/0124057 A1 | 5/2007 | Prieto |
| 2007/0135101 A1 | 6/2007 | Ramati |
| 2007/0146833 A1 | 6/2007 | Satomi |
| 2007/0162296 A1 | 7/2007 | Altberg |
| 2007/0174258 A1 | 7/2007 | Jones |
| 2007/0179778 A1 | 8/2007 | Gong |
| 2007/0185859 A1 | 8/2007 | Flowers |
| 2007/0186165 A1 | 8/2007 | Maislos |
| 2007/0192309 A1 | 8/2007 | Fischer |
| 2007/0198267 A1 | 8/2007 | Jones |
| 2007/0203699 A1 | 8/2007 | Nagashima |
| 2007/0203736 A1 | 8/2007 | Ashton |
| 2007/0208732 A1 | 9/2007 | Flowers |
| 2007/0214182 A1 | 9/2007 | Rosenberg |
| 2007/0250901 A1 | 10/2007 | McIntire |
| 2007/0265850 A1 | 11/2007 | Kennewick |
| 2007/0266257 A1 | 11/2007 | Camaisa |
| 2007/0276651 A1 | 11/2007 | Bliss |
| 2007/0294615 A1 | 12/2007 | Sathe |
| 2007/0299824 A1 | 12/2007 | Pan |
| 2008/0014908 A1 | 1/2008 | Vasant |
| 2008/0034032 A1 | 2/2008 | Healey |
| 2008/0046311 A1 | 2/2008 | Shahine |
| 2008/0059188 A1 | 3/2008 | Konopka |
| 2008/0065386 A1 | 3/2008 | Cross |
| 2008/0065389 A1 | 3/2008 | Cross |
| 2008/0065390 A1 | 3/2008 | Ativanichayaphong |
| 2008/0086455 A1 | 4/2008 | Meisels |
| 2008/0091406 A1 | 4/2008 | Baldwin |
| 2008/0103761 A1 | 5/2008 | Printz |
| 2008/0103781 A1 | 5/2008 | Wasson |
| 2008/0104071 A1 | 5/2008 | Pragada |
| 2008/0109285 A1 | 5/2008 | Reuther |
| 2008/0115163 A1 | 5/2008 | Gilboa |
| 2008/0126091 A1 | 5/2008 | Clark |
| 2008/0133215 A1 | 6/2008 | Sarukkai |
| 2008/0140385 A1 | 6/2008 | Mahajan |
| 2008/0147396 A1 | 6/2008 | Wang |
| 2008/0147410 A1 | 6/2008 | Odinak |
| 2008/0147637 A1 | 6/2008 | Li |
| 2008/0154604 A1 | 6/2008 | Sathish |
| 2008/0162471 A1 | 7/2008 | Bernard |
| 2008/0177530 A1 | 7/2008 | Cross |
| 2008/0184164 A1 | 7/2008 | Di Fabbrizio |
| 2008/0189110 A1 | 8/2008 | Freeman |

(56) References Cited

U.S. PATENT DOCUMENTS

| | | |
|---|---|---|
| 2008/0228496 A1 | 9/2008 | Yu |
| 2008/0235023 A1 | 9/2008 | Kennewick |
| 2008/0235027 A1 | 9/2008 | Cross |
| 2008/0269958 A1 | 10/2008 | Filev |
| 2008/0270135 A1 | 10/2008 | Goel |
| 2008/0270224 A1 | 10/2008 | Portman |
| 2008/0294437 A1 | 11/2008 | Nakano |
| 2008/0294994 A1 | 11/2008 | Kruger |
| 2008/0306743 A1 | 12/2008 | Di Fabbrizio |
| 2008/0319751 A1 | 12/2008 | Kennewick |
| 2009/0006077 A1 | 1/2009 | Keaveney |
| 2009/0006194 A1 | 1/2009 | Sridharan |
| 2009/0018829 A1 | 1/2009 | Kuperstein |
| 2009/0024476 A1 | 1/2009 | Baar |
| 2009/0030686 A1 | 1/2009 | Weng |
| 2009/0052635 A1 | 2/2009 | Jones |
| 2009/0055176 A1 | 2/2009 | Hu |
| 2009/0067599 A1 | 3/2009 | Agarwal |
| 2009/0076827 A1 | 3/2009 | Bulitta |
| 2009/0106029 A1 | 4/2009 | DeLine |
| 2009/0117885 A1 | 5/2009 | Roth |
| 2009/0144131 A1 | 6/2009 | Chiu |
| 2009/0144271 A1 | 6/2009 | Richardson |
| 2009/0150156 A1 | 6/2009 | Kennewick |
| 2009/0157382 A1 | 6/2009 | Bar |
| 2009/0164216 A1 | 6/2009 | Chengalvarayan |
| 2009/0171664 A1 | 7/2009 | Kennewick |
| 2009/0171912 A1 | 7/2009 | Nash |
| 2009/0197582 A1 | 8/2009 | Lewis |
| 2009/0216540 A1 | 8/2009 | Tessel |
| 2009/0248565 A1 | 10/2009 | Chuang |
| 2009/0248605 A1 | 10/2009 | Mitchell |
| 2009/0259561 A1 | 10/2009 | Boys |
| 2009/0259646 A1 | 10/2009 | Fujita |
| 2009/0265163 A1 | 10/2009 | Li |
| 2009/0271194 A1 | 10/2009 | Davis |
| 2009/0273563 A1 | 11/2009 | Pryor |
| 2009/0276700 A1 | 11/2009 | Anderson |
| 2009/0287680 A1 | 11/2009 | Paek |
| 2009/0299745 A1 | 12/2009 | Kennewick |
| 2009/0299857 A1 | 12/2009 | Brubaker |
| 2009/0304161 A1 | 12/2009 | Pettyjohn |
| 2009/0307031 A1 | 12/2009 | Winkler |
| 2009/0313026 A1 | 12/2009 | Coffman |
| 2009/0319517 A1 | 12/2009 | Guha |
| 2010/0023320 A1 | 1/2010 | Cristo |
| 2010/0023331 A1 | 1/2010 | Duta |
| 2010/0029261 A1 | 2/2010 | Mikkelsen |
| 2010/0036967 A1 | 2/2010 | Caine |
| 2010/0049501 A1 | 2/2010 | Kennewick |
| 2010/0049514 A1 | 2/2010 | Kennewick |
| 2010/0057443 A1 | 3/2010 | Cristo |
| 2010/0063880 A1 | 3/2010 | Atsmon |
| 2010/0064025 A1 | 3/2010 | Nelimarkka |
| 2010/0094707 A1 | 4/2010 | Freer |
| 2010/0138300 A1 | 6/2010 | Wallis |
| 2010/0145700 A1 | 6/2010 | Kennewick |
| 2010/0185512 A1 | 7/2010 | Borger |
| 2010/0204986 A1 | 8/2010 | Kennewick |
| 2010/0204994 A1 | 8/2010 | Kennewick |
| 2010/0217604 A1 | 8/2010 | Baldwin |
| 2010/0268536 A1 | 10/2010 | Suendermann |
| 2010/0286985 A1 | 11/2010 | Kennewick |
| 2010/0299142 A1 | 11/2010 | Freeman |
| 2010/0312566 A1 | 12/2010 | Odinak |
| 2010/0318357 A1 | 12/2010 | Istvan |
| 2010/0331064 A1 | 12/2010 | Michelstein |
| 2011/0022393 A1 | 1/2011 | Waller |
| 2011/0106527 A1 | 5/2011 | Chiu |
| 2011/0112827 A1 | 5/2011 | Kennewick |
| 2011/0112921 A1 | 5/2011 | Kennewick |
| 2011/0119049 A1 | 5/2011 | Ylonen |
| 2011/0131036 A1 | 6/2011 | DiCristo |
| 2011/0131045 A1 | 6/2011 | Cristo |
| 2011/0231182 A1 | 9/2011 | Weider |
| 2011/0231188 A1 | 9/2011 | Kennewick |
| 2011/0238409 A1 | 9/2011 | Larcheveque |
| 2011/0307167 A1 | 12/2011 | Taschereau |
| 2012/0022857 A1 | 1/2012 | Baldwin |
| 2012/0041753 A1 | 2/2012 | Dymetman |
| 2012/0046935 A1 | 2/2012 | Nagao |
| 2012/0101809 A1 | 4/2012 | Kennewick |
| 2012/0101810 A1 | 4/2012 | Kennewick |
| 2012/0109753 A1 | 5/2012 | Kennewick |
| 2012/0150620 A1 | 6/2012 | Mandyam |
| 2012/0150636 A1 | 6/2012 | Freeman |
| 2012/0239498 A1 | 9/2012 | Ramer |
| 2012/0240060 A1 | 9/2012 | Pennington |
| 2012/0265528 A1 | 10/2012 | Gruber |
| 2012/0278073 A1 | 11/2012 | Weider |
| 2013/0006734 A1 | 1/2013 | Ocko |
| 2013/0054228 A1 | 2/2013 | Baldwin |
| 2013/0060625 A1 | 3/2013 | Davis |
| 2013/0080177 A1 | 3/2013 | Chen |
| 2013/0211710 A1 | 8/2013 | Kennewick |
| 2013/0253929 A1 | 9/2013 | Weider |
| 2013/0254314 A1 | 9/2013 | Chow |
| 2013/0297293 A1 | 11/2013 | Cristo |
| 2013/0304473 A1 | 11/2013 | Baldwin |
| 2013/0311324 A1 | 11/2013 | Stoll |
| 2013/0332454 A1 | 12/2013 | Stuhec |
| 2013/0339022 A1 | 12/2013 | Baldwin |
| 2014/0006951 A1 | 1/2014 | Hunter |
| 2014/0012577 A1 | 1/2014 | Freeman |
| 2014/0025371 A1 | 1/2014 | Min |
| 2014/0108013 A1 | 4/2014 | Cristo |
| 2014/0156278 A1 | 6/2014 | Kennewick |
| 2014/0195238 A1 | 7/2014 | Terao |
| 2014/0236575 A1 | 8/2014 | Tur |
| 2014/0249821 A1 | 9/2014 | Kennewick |
| 2014/0249822 A1 | 9/2014 | Baldwin |
| 2014/0278413 A1 | 9/2014 | Pitschel |
| 2014/0278416 A1 | 9/2014 | Schuster |
| 2014/0288934 A1 | 9/2014 | Kennewick |
| 2014/0330552 A1 | 11/2014 | Bangalore |
| 2014/0365222 A1 | 12/2014 | Weider |
| 2015/0019211 A1 | 1/2015 | Simard |
| 2015/0019217 A1 | 1/2015 | Cristo |
| 2015/0019227 A1 | 1/2015 | Anandarajah |
| 2015/0066479 A1* | 3/2015 | Pasupalak ............... G06F 17/27 704/9 |
| 2015/0066627 A1 | 3/2015 | Freeman |
| 2015/0073910 A1 | 3/2015 | Kennewick |
| 2015/0095159 A1 | 4/2015 | Kennewick |
| 2015/0142447 A1 | 5/2015 | Kennewick |
| 2015/0170641 A1 | 6/2015 | Kennewick |
| 2015/0193379 A1 | 7/2015 | Mehta |
| 2015/0199339 A1 | 7/2015 | Mirkin |
| 2015/0228276 A1 | 8/2015 | Baldwin |
| 2015/0293917 A1 | 10/2015 | Bufe |
| 2015/0348544 A1 | 12/2015 | Baldwin |
| 2015/0348551 A1 | 12/2015 | Gruber |
| 2015/0364133 A1 | 12/2015 | Freeman |
| 2016/0049152 A1 | 2/2016 | Kennewick |
| 2016/0078482 A1 | 3/2016 | Kennewick |
| 2016/0078491 A1 | 3/2016 | Kennewick |
| 2016/0078504 A1 | 3/2016 | Kennewick |
| 2016/0078773 A1 | 3/2016 | Carter |
| 2016/0110347 A1 | 4/2016 | Kennewick |
| 2016/0148610 A1 | 5/2016 | Kennewick |
| 2016/0148612 A1 | 5/2016 | Guo |
| 2016/0188292 A1 | 6/2016 | Carter |
| 2016/0188573 A1 | 6/2016 | Tang |
| 2016/0217785 A1 | 7/2016 | Kennewick |
| 2016/0335676 A1 | 11/2016 | Freeman |

FOREIGN PATENT DOCUMENTS

| | | |
|---|---|---|
| EP | 1320043 A2 | 6/2003 |
| EP | 1646037 | 4/2006 |
| JP | H08263258 | 10/1996 |
| JP | H11249773 | 9/1999 |
| JP | 2001071289 | 3/2001 |
| JP | 2006146881 | 6/2006 |

(56) References Cited

FOREIGN PATENT DOCUMENTS

| JP | 2008027454 | 2/2008 |
|---|---|---|
| JP | 2008058465 | 3/2008 |
| JP | 2008139928 | 6/2008 |
| JP | 2011504304 | 2/2011 |
| JP | 2012518847 | 8/2012 |
| WO | 9946763 | 9/1999 |
| WO | 0021232 | 1/2000 |
| WO | 0046792 | 1/2000 |
| WO | 0171609 A2 | 9/2001 |
| WO | 0178065 | 10/2001 |
| WO | 2004072954 | 8/2004 |
| WO | 2005010702 A2 | 2/2005 |
| WO | 2007019318 | 1/2007 |
| WO | 2007021587 | 1/2007 |
| WO | 2007027546 | 1/2007 |
| WO | 2007027989 | 1/2007 |
| WO | 2008098039 | 1/2008 |
| WO | 2008118195 | 1/2008 |
| WO | 2009075912 | 1/2009 |
| WO | 2009145796 | 1/2009 |
| WO | 2009111721 | 9/2009 |
| WO | 2010096752 | 1/2010 |
| WO | 2016044290 | 3/2016 |
| WO | 2016044316 | 3/2016 |
| WO | 2016044319 | 3/2016 |
| WO | 2016044321 | 3/2016 |
| WO | 2016061309 | 4/2016 |

OTHER PUBLICATIONS

Arrington, Michael, "Google Redefines GPS Navigation Landscape: Google Maps Navigation for Android 2.0", TechCrunch, printed from the Internet <http://www.techcrunch.com/2009/10/28/google-redefines-car-gps-navigation-google-maps-navigation-android/>, Oct. 28, 2009, 4 pages.
Bazzi, Issam et al., "Heterogeneous Lexical Units for Automatic Speech Recognition: Preliminary Investigations", Proceedings of the IEEE International Conference on Acoustics, Speech, and Signal Processing, vol. 3, Jun. 5-9, 2000, XP010507574, pp. 1257-1260.
Belvin, Robert, et al., "Development of the HRL Route Navigation Dialogue System", Proceedings of the First International Conference on Human Language Technology Research, San Diego, 2001, pp. 1-5.
Chai et al., "MIND: A Semantics-Based Multimodal Interpretation Framework for Conversational Systems", Proceedings of the International CLASS Workshop on Natural, Intelligent and Effective Interaction in Multimodal Dialogue Systems, Jun. 2002, pp. 37-46.
Cheyer et al., "Multimodal Maps: An Agent-Based Approach", International Conference on Cooperative Multimodal Communication (CMC/95), May 24-26, 1995, pp. 111-121.
Davis, Z., et al., A Personal Handheld Multi-Modal Shopping Assistant, IEEE, 2006, 9 pages.
El Meliani et al., "A Syllabic-Filler-Based Continuous Speech Recognizer for Unlimited Vocabulary", Canadian Conference on Electrical and Computer Engineering, vol. 2, Sep. 5-8, 1995, pp. 1007-1010.
Elio et al., "On Abstract Task Models and Conversation Policies" in Workshop on Specifying and Implementing Conversation Policies, Autonomous Agents '99, Seattle, 1999, 10 pages.
Kirchhoff, Katrin, "Syllable-Level Desynchronisation of Phonetic Features for Speech Recognition", Proceedings of the Fourth International Conference on Spoken Language, 1996, ICSLP 96, vol. 4, IEEE, 1996, 3 pages.
Kuhn, Thomas, et al., "Hybrid In-Car Speech Recognition for Mobile Multimedia Applications", Vehicular Technology Conference, IEEE, Jul. 1999, pp. 2009-2013.
Lin, Bor-shen, et al., "A Distributed Architecture for Cooperative Spoken Dialogue Agents with Coherent Dialogue State and History", ASRU'99, 1999, 4 pages.
Lind, R., et al., "The Network Vehicle—A Glimpse into the Future of Mobile Multi-Media", IEEE Aerosp. Electron. Systems Magazine, vol. 14, No. 9, Sep. 1999, pp. 27-32.
Mao, Mark Z., "Automatic Training Set Segmentation for Multi-Pass Speech Recognition", Department of Electrical Engineering, Stanford University, CA, copyright 2005, IEEE, pp. I-685 to I-688.
O'Shaughnessy, Douglas, "Interacting with Computers by Voice: Automatic Speech Recognition and Synthesis", Proceedings of the IEEE, vol. 91, No. 9, Sep. 1, 2003, XP011100665. pp. 1272-1305.
Reuters, "IBM to Enable Honda Drivers to Talk to Cars", Charles Schwab & Co., Inc., Jul. 28, 2002, 1 page.
Turunen, "Adaptive Interaction Methods in Speech User Interfaces", Conference on Human Factors in Computing Systems, Seattle, Washington, 2001, pp. 91-92.
Vanhoucke, Vincent, "Confidence Scoring and Rejection Using Multi-Pass Speech Recognition", Nuance Communications, Menlo Park, CA, 2005, 4 pages.
Weng, Fuliang, et al., "Efficient Lattice Representation and Generation", Speech Technology and Research Laboratory, SRI International, Menlo Park, CA, 1998, 4 pages.
Wu, Su-Lin, et al., "Incorporating Information from Syllable-Length Time Scales into Automatic Speech Recognition", Proceedings of the 1998 IEEE International Conference on Acoustics, Speech and Signal Processing, 1998, vol. 2, IEEE, 1998, 4 pages.
Wu, Su-Lin, et al., "Integrating Syllable Boundary Information into Speech Recognition", IEEE International Conference on Acoustics, Speech, and Signal Processing, ICASSP-97, 1997, vol. 2, IEEE, 1997, 4 pages.
Zhao, Yilin, "Telematics: Safe and Fun Driving", IEEE Intelligent Systems, vol. 17, Issue 1, 2002, pp. 10-14.
International Preliminary Report on Patentability dated Feb. 7, 2019 from corresponding International Patent Application No. PCT/US2017/044610, 7 pages.

* cited by examiner

SYSTEM AND METHOD OF DISAMBIGUATING NATURAL LANGUAGE PROCESSING REQUESTS

CROSS-REFERENCE TO RELATED APPLICATIONS

This application claims the benefit of U.S. Provisional Patent Application Ser. No. 62/368,975, entitled "SYSTEM AND METHOD OF DISAMBIGUATING NATURAL LANGUAGE PROCESSING REQUESTS", filed Jul. 29, 2016, which is hereby incorporated herein by reference in its entirety.

FIELD OF THE INVENTION

The invention relates to a system and method of disambiguating natural language processing requests based on smart matching, request confirmations that are used until ambiguities are resolved, and machine learning.

BACKGROUND OF THE INVENTION

Facilitating human to machine interactions in a natural manner is a difficult problem. Both non-voice and certain voice interfaces tend to be overly structured and require some level of familiarity with the interfaces. An ability for a human to interact with machines using natural language utterances in various contexts remains a desirable goal. However, human interaction with machines in various contexts remains a difficult problem.

One area of difficulty lies in the disambiguation of natural language requests. The objects of natural language requests and command, entity names, may sometimes be ambiguous. For example, a user may have multiple contacts of the same name in their directory. A phone dialing request made by first name may require disambiguation. A natural language system however, that constantly requests a user to use specific and unambiguous language or to clarify requests made in ambiguous language may quickly begin to feel burdensome for the user.

These and other drawbacks exist with conventional natural language processing disambiguation methods.

SUMMARY OF THE INVENTION

The invention addressing these and other drawbacks relates to a system and method of machine learned disambiguation of natural language processing requests. An intent of a natural language input (e.g., a natural language utterance of a user) may be ambiguous. For example, a user may provide the input "call John," when there are several "Johns" in the user's contact list. Other types of ambiguities and other types of requests may be ambiguous based on natural language processing as well.

The system may disambiguate natural language processing requests based on smart matching, request confirmations that are used until ambiguities are resolved, and machine learning. Smart matching may match entities (e.g., contact names, place names, etc.) based on user information such as call logs, user preferences, etc. If multiple matches are found and disambiguation has not yet been learned by the system for these matches, the system may request that the user identify the intended entity. On the other hand, if disambiguation has been learned by the system, the system may execute the request without confirmations. The system may use a record of confirmations and/or other information to continuously learn a user's inputs in order to reduce ambiguities and no longer prompt for confirmations.

To this end, the system may include a smart matching engine that identifies and matches entities, a confirmation engine that generates request confirmations (e.g., "do you want to call John Doe or John Smith"?) that are used until a sufficient level of confidence that an ambiguity relating to a given natural language input has been resolved (e.g., until the system is confident that the user intends to call "John Doe" and not "John Smith"), a learning engine that uses machine learning based on user information (e.g., history of request confirmations from a user, where each request confirmation sought to resolve a prior ambiguous result of natural language processing from a prior natural language input), and/or other components to disambiguate a natural language input.

The smart matching engine may identify an input entity name. The smart matching engine may then match the input entity name to an entity name that can be acted upon. For example, if the user requests directions to Main St., then the smart matching engine may operate to suggest a match between the user uttered input entity name "Main St." and an identified entity name—i.e., an actual, mappable, Main St. If the user asks to "call James," then the smart matching engine may operate to suggest a match between an identified entity name, i.e., an actual contact in the user's directory, and the input entity name of "James."

The smart matching engine may suggest a match between an input entity name and an identified entity name based at least partially on an entity matching model. The entity matching model may comprise information compiled through machine learning techniques, and may include at least context information and user history information, as well as other information suitable for machine learning. A suggested match may include the input entity name and an identified entity name. A suggested match may further include additional entity match information.

Additional entity match information may include context information related to the natural language request, the input entity name, and the identified entity name. For example, for a user that lives in New York, an entity matching model may associate the entity name "taxi" in the request "call a taxi" with a particular taxi company in New York. When creating a suggested match for the input entity name "taxi," for that user, the smart matching engine may include the additional entity match information of the user's location as part of the suggested match. This may permit the system to disambiguate the term "taxi" differently based on the user's location.

Context information usable by the smart matching engine may include a request context. For example, if a user makes a request to "call James" during the business day, the smart matching engine may suggest a match between the input entity name James and a business contact named James. If the request is made after hours, the smart matching engine may suggest a match with a contact from a friends and family contact list. Similarly, when attempting to disambiguate requests for directions, smart matching engine may suggest matches between locations that are closer to a present location of the user.

User history information usable by the smart matching engine may include information about previous user requests and activity. For example, when requesting to make a call, the smart matching engine may select a name from a user's contact list that the user calls very frequently. When seeking directions, the smart matching engine may suggest a destination location that matches a location the user has travelled to frequently.

The smart matching engine may additionally employ machine learned matching techniques. For example, a user may frequently refer to a contact name by a nickname, making a request to "call Jim," where the name "James" is stored in the user's contact list. Such a connection may become a part of an entity matching model based on machine learning techniques, as described in more detail below.

In some implementations, the smart matching engine may suggest a match between an input entity name and an identified entity name based on an exact match. For example, where a user requests to "call John," the system may suggest only matches that match "John" exactly. In some implementations, the smart matching engine may suggest a match between an input entity name and an identified entity name based on a phonetic match. For example, where a user requests to "call John," the system may suggest all matches that sound like "John," including, for example, "Jon." In some implementations, the smart matching engine may suggest a match between an input entity name and an identified entity name based on similar sounds. Continuing to use the above example, the smart matching engine may suggest a match between "John" and "Juwan." In some implementations the smart matching engine may suggest a match between an input entity name and an identified entity name based on an interpretation of a user's pronunciation style.

In some implementations, the smart matching engine may suggest a match between an input entity name and an identified entity name based on learned associations. For example, a user may request to "call my brother." The smart matching engine may suggest a match between the input entity name "my brother," and all user contacts having a same last name as the user. The smart matching engine may also request clarification from the user about the entity name "my brother." Once the system has successfully confirmed a match between a user contact and the input entity name "my brother," the entity matching model may be updated with the information in order to correctly link the input entity name "my brother" to the appropriate contact. In another example, a user may request directions to "the pizza place." Smart matching engine may propose a suggested match between the input entity name "the pizza place," and the closest pizza restaurant. Once the system has successfully confirmed a match between "the pizza place," and a particular pizza restaurant, the entity matching model may be updated to associate "the pizza place," with the specific pizza restaurant.

In some implementations, the smart matching engine may pass a suggested match between an input named entity and an identified named entity to confirmation engine for command confirmation, as described below.

In some implementations, the smart matching engine may determine an alternate identified entity name if the confirmation engine is unable to confirm the suggested match between the input named entity and the identified entity name. In some implementations, the smart matching engine may determine an alternate identified entity name using similar methods to those described above for selecting the first identified entity name. In determining an alternate identified entity name, the smart matching engine may select a next best match for an input entity name. In some implementations, the smart matching engine may develop an n-best list of suggested matches for an input entity name including n number of potential matches ranked in order of best fit. The smart matching engine may provide the 2nd, 3rd, 4th, etc., matches from an n-best list, in order, to the confirmation engine as alternate identified names if the first suggestion is cancelled or met with non-confirmation. In some implementations, the smart matching engine may provide an entire n-best list to the confirmation engine.

The confirmation engine may perform command confirmation based on a user's confirmation history of a proposed entity match. Command confirmation may be performed actively and/or passively. For example, active command confirmation may include querying the user to confirm a suggest match—e.g., where a user has asked to "call James," a command confirmation may query the user "did you mean James Smith?" In some implementations, passive command confirmation may include permitting a user a predefined amount of time to cancel an action. For example, where a user has asked to "call James," a command confirmation may alert the user "calling James Smith," and wait for a predetermined amount of time to give the user a chance to cancel the action before executing the action. If the user does not cancel the action, then the suggested entity match may be confirmed. A predetermined amount of time may be relatively short, e.g., 1 to 5 seconds, or relatively long, e.g., 5-15 seconds. Selecting which command confirmation method to use may be based on a user's confirmation history.

For example, the confirmation engine may use a history of a user's confirmation between a particular input entity name and a particular identified entity name. For example, a user may ask to "call James," and the smart matching engine may determine a suggested match between the input entity name "James" and an identified entity name "James Smith," corresponding to a user contact. If the smart matching engine has previously suggested the same match, and the user has previously provided confirmations, the confirmation engine may alert the user of the impending action. If the user has not previously provided enough confirmations of the suggested match, the confirmation engine may request active confirmation from the user. The confirmation engine may switch between these two methods when a number of previous confirmations of the suggested match exceeds a predetermined threshold number of times. Such a predetermined threshold number may be one or more times. A predetermined threshold number may vary depending on the type of entity name that is being matched (e.g., whether it is a contact name or a location address.)

In some implementations, the confirmation engine may update a number of previous confirmations of a suggested match in a user's confirmation history after confirmation or non-confirmation is received from the user. If confirmation is received from the user for a particular suggested match, the confirmation engine may increment the number of previous confirmations. If a user cancels or fails to confirm a suggested match, the confirmation engine may instead decrement the number of previous confirmations. In some implementations, the confirmation engine may reset a number of previous confirmations to zero after a non-confirmation is received. In some implementations, the confirmation engine may separately record a number of non-confirmations and decrement or reset the previous confirmation score after a threshold number of non-confirmations is reached. In some implementations, the confirmation engine may separately record a number of consecutive non-confirmations and decrement or reset the previous confirmation score after a threshold number of consecutive non-confirmations is reached. In some implementations, the confirmation engine may do nothing to a previous confirmation score when a non-confirmation is received.

In some implementations, the confirmation engine may request an alternate identified match from the smart matching engine if a non-confirmation or cancellation is received. The smart matching engine may provide a next best alternate identified match to the confirmation engine. The confirmation engine may treat the alternate identified match similarly to the initial identified match, and determine an active or passive confirmation method based on a number of previous confirmations.

In some implementations, the confirmation engine may receive an n-best list from the smart matching engine. The confirmation engine may then try to confirm with the user each entry in the n-best list as a selected match. In some implementations, the confirmation engine may try each member of the n-best list in turn, using the above-discussed confirmation methods based on confirmation history. In some implementations, the confirmation engine may try to confirm the first entry of a an n-best list, and, if confirmation fails, query the user to select from the remaining entries in the n-best list.

The learning engine may provide machine learning updates to a smart matching model used by the smart matching engine and confirmation engine in suggesting and confirming matches between natural language inputs and named entities, and/or other instructions that computer system 110 to perform various operations, each of which are described in greater detail herein.

The learning engine may include instructions for updating an entity matching model based on results provided by the smart matching engine and the confirmation engine. As described above, the smart matching engine may suggest a match between an input entity name and an identified entity name, while the confirmation engine may operate to confirm the identified entity name and determine it as a selected entity name. When an entity name is confirmed as a selected entity name, the learning engine may update the entity matching model with information about the confirmed match. The learning engine may update context information of the entity matching model with information about the context (e.g., time, location, whether the user is traveling, etc.) under which the suggested match was confirmed. The learning engine may update user history information of the entity matching model, for example, to keep track of a frequency of user requests involving the selected entity name.

For example, where a user has a requested to make a phone call or send a text message to a contact and the confirmation engine confirms the suggested match provided by the smart matching engine, the learning engine may update the entity matching model with information about the match between the input entity name and the identified entity name, including, for example, time of day, location of the user, category of the entity name (e.g., business or personal contact), and any other suitable information. In some implementations, when the confirmation engine obtains a non-confirm result of a suggested match, the learning engine may update entity matching model with information that the match was not confirmed, as well as other context information associated with the failed match.

For example, a user may frequently his brother "James Lewis" in the evening but call his business associate "James Smith" during the day. Due to a frequency of calls, the smart matching engine may initially suggest a match between the request to "call James," and "James Smith," even when the call is taking place after 9 pm. After one or more non-confirmations between a command to "call James" at 9 pm and "James Smith," the learning engine may sufficiently update the entity matching model to make an association between "James" and the user's brother "James Lewis" in the evening, and between "James" and the user's business associate "James Smith" during the day.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method of natural language processing disambiguation. In particular, the systems and methods described are related to machine learning of disambiguation models. The system may be configured to receive and process natural language inputs, and then use machine learning techniques to optimally provide disambiguation between potentially ambiguous inputs.

For example, a user may have multiple contacts having the same first or last name in a directory. If a user makes a natural language request to "Call John," when there are three Johns stored in the users contact directory, the system may employ disambiguation models to determine which John the user the intended. The system may review context data, including call frequency, call timing, user location, and other information, to determine a suggestion to match the user's request. The user may then be prompted to confirm the suggestion, and/or, in some implementations, be provided with a time in which to cancel the suggestion, before the request is carried out using the suggestion. The system may incorporate the user response in disambiguation models to optimize future suggestions and actions. Further examples of user requests requiring disambiguation may include requests for directions (e.g., where multiple destinations may have similar names), requests for weather reports (e.g., where the user fails to specify the location of request), requests to play music (e.g., where the user selects an album but not an artist) and others. Disambiguation may be required between identical user requests, between phonetically similar requests, between homophonic requests, and/or between requests that may sound similar based on user pronunciation. The system may further be configured for disambiguation of generic requests to identify a user's specific intent. For example, a request to "call the pizza place," may be disambiguated to a phone dialing request to contact a specific pizza restaurant that a user frequently calls.

Figure 1:
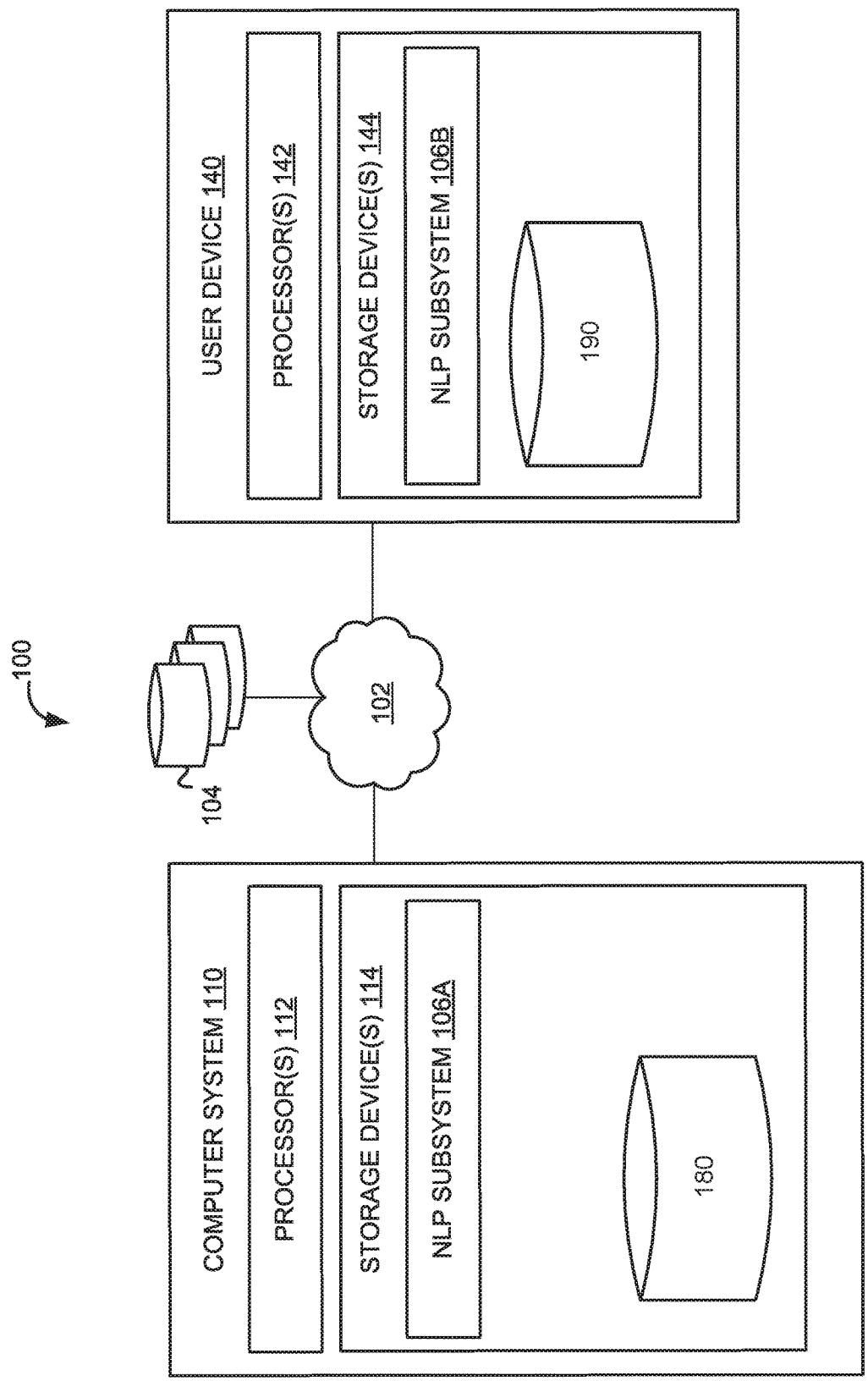
FIG. 1 illustrates a system for natural language processing, according to an implementation of the invention.

FIG. 1 illustrates a system 100 for natural language processing. In one implementation, system 100 may include a computer system 110, a user device 140, a database 104, and/or other components. Components of system 100 may communicate with one another via network 102. Network 102 may be any type of network, such as a WAN, LAN, Bluetooth network, the Internet, etc.

Computer system 110 may be configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed for natural language processing, and, in particular the disambiguation of natural language processing requests.

Computer system 110 may include one or more processors 112 (also interchangeably referred to herein as processors 112, processor(s) 112, or processor 112 for convenience), one or more storage devices 114, and/or other components. Processors 112 may be programmed by one or more computer program instructions. For example, processors 112 may be programmed by NLP subsystem 106A, and/or other instructions that program computer system 110 to perform various operations, each of which are described in greater detail herein. As used herein, for convenience, the various instructions and engines will be described as performing an operation, when, in fact, the various instructions program the processors 112 (and therefore computer system 110) to perform the operation. Storage device 114 may further include a user history database 180.

Figure 2:
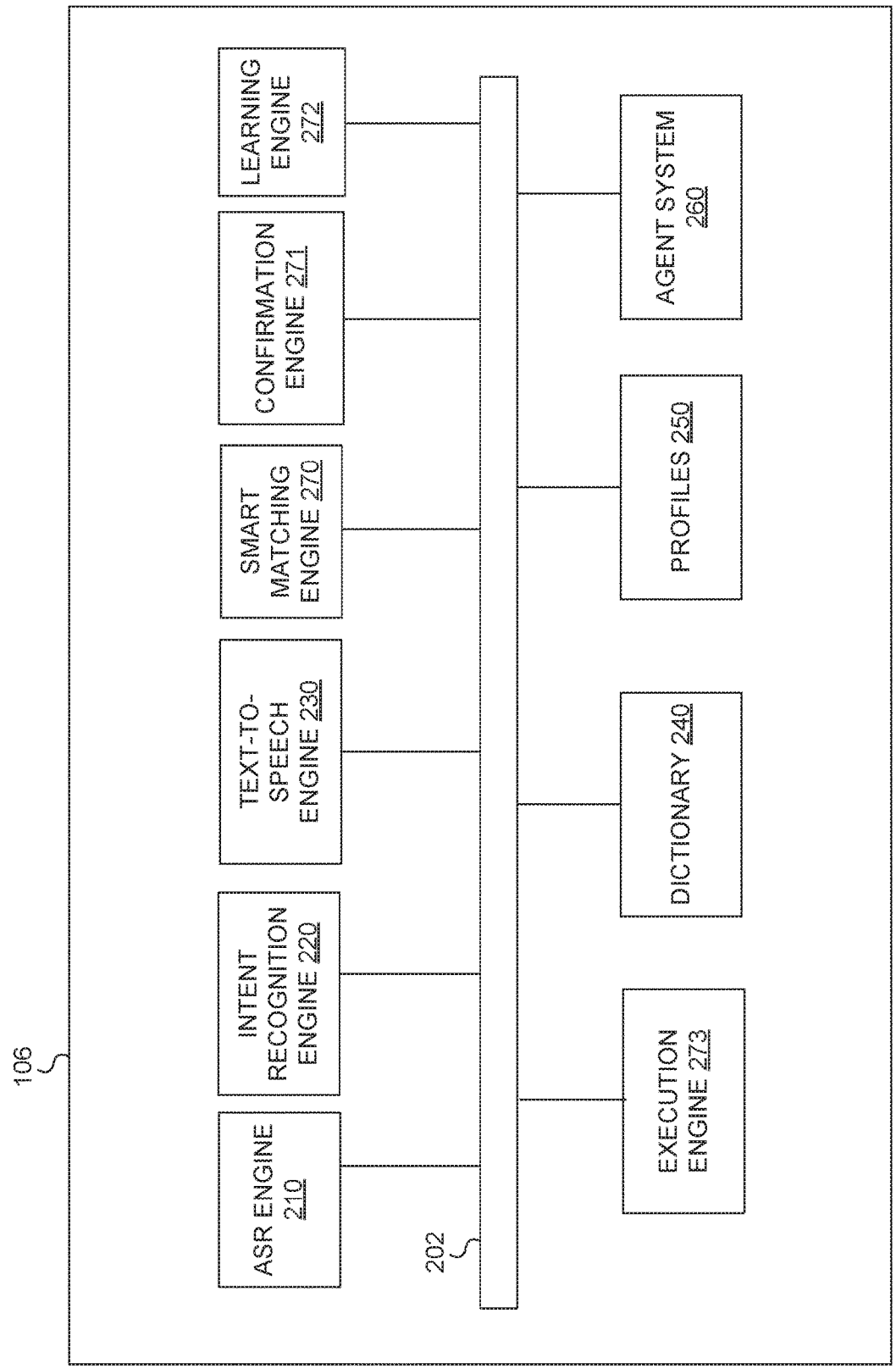
FIG. 2 depicts an NLP system configured to perform natural language processing on an utterance, according to an implementation of the invention.

NLP subsystem 106A may perform at least some aspects of natural language processing on an utterance using all or a portion of the components of NLP subsystem 106 illustrated in FIG. 2. In other words, computer system 110 may be programmed with some or all of the functions of NLP system 106 described with respect to FIG. 2.

User device 140 may be configured as a server device, a gaming console, a handheld gaming device, a personal computer (e.g., a desktop computer, a laptop computer, etc.), a smartphone, a tablet computing device, and/or other device that can be programmed to receive and interpret natural language processing requests. In particular, user device 140 may be programmed to perform disambiguation on a received natural language input.

User device 140 may include one or more processors 142 (also interchangeably referred to herein as processors 142, processor(s) 142, or processor 142 for convenience), one or more storage devices 144, and/or other components. Processors 142 may be programmed by one or more computer program instructions. For example, processors 142 may be programmed by NLP subsystem 106B, and/or other instructions that program computer system 110 to perform various operations, each of which are described in greater detail herein. As used herein, for convenience, the various instructions will be described as performing an operation, when, in fact, the various instructions program the processors 142 (and therefore user device 140) to perform the operation. Additionally storage device 144 may include one or more databases, including a user information a user history database 190.

Any or all aspects of natural language processing may be carried out by programming instructions instantiated on either NLP subsystem 106b of user device 140 and NLP subsystem 106a of computer system 110. Each of user device 140 and computer system 110 may perform all or a portion of a natural language processing task. User device 140 and computer system 110 may operate to perform natural language processing tasks sequentially, communicating results via network 102. In such implementations, one system may pass results of a completed task to the other system for further processing. User device 140 and computer system may operate to redundantly perform natural language processing tasks. In such implementations, depending upon the results of a natural language processing task carried out by one system, the other system may repeat the same task. User device 140 and computer system 110 may operate in parallel to perform natural language processing tasks. In such implementations, user device 140 and computer system 110 may each perform one or more tasks independently and, after task completion, communicate with each other to select between and or combine the processing results.

NLP subsystem 106B may perform at least some aspects of natural language processing on an utterance using all or a portion of the components of NLP subsystem 106 illustrated in FIG. 2. In other words, user device 140 may be programmed with some or all of the functions of NLP system 106 described with respect to FIG. 2.

Although illustrated in FIG. 1 as a single component, computer system 110 and user device 140 may each include a plurality of individual components (e.g., computer devices) each programmed with at least some of the functions described herein. In this manner, some components of computer system 110 and/or user device 140 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

The various databases 104 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Natural Language Processing

FIG. 2 depicts an NLP system 106 configured to perform natural language processing on an utterance, according to an implementation of the invention. NLP system 106 may include a an Automated Speech Recognition ("ASR") engine 210, an Intent Recognition Engine ("IRE") 220, text-to-speech engine 230, a dictionary 240, a user profile 250, an agent system 260, smart matching engine 270, confirmation engine 271, learning engine 272, execution engine 273, and/or other components. The components of NLP system 106 may communicate with one another via communication manager 202, which may mediate interactions between components of NLP system 106.

NLP system 106 may process an utterance encoded into audio to determine words or phrases from the utterance. Alternatively, NLP system 106 may process text that was already detected from the utterance. In whichever manner the utterance is received (e.g., whether as encoded audio or text), NLP system 106 may determine an intent of the utterance using the words or phrases, formulate requests based on its intent, and facilitate generating a response to or executing the request.

For example, in implementations in which an utterance is received as audio, ASR engine 210 may use words and phrases from dictionary 240 and information received from agent system 260 (discussed below) to recognize words from the utterance (i.e., the audio). The recognized words and phrases are processed by IRE 220, which determines the intent of the utterance and generates a request that corresponds to the utterance based on context, and information from agent system 260. The request may include a query (e.g., "what is the weather like in Seattle?") a command (e.g., "turn up the volume"), and/or other information.

To process the intent of the utterance, IRE 220 may use keywords within the utterance itself to identify context. For example, for the utterance "what is the weather like in Seattle," IRE 220 may determine that the context is weather and a subject is "Seattle." In some instances, the contextual information may be based on immediately prior utterances. In these instances, IRE 220 may generate a stack that stores (e.g., in Random Access Memory) information relating to one or more previous utterances in a given session (which may be defined by utterances received within a threshold time of one another). For example, a first utterance "what is the weather like in Seattle" may be followed up with a second utterance "book me a flight there." By itself, the second utterance "book me a flight there" may be non-specific because "there" is undefined in the second utterance. However, when processed as part of a stack that includes information relating to the first utterance "what is the weather like in Seattle," IRE 220 determines that "there" refers to "Seattle."

A natural language input may comprise a request and an entity name. A request may include several types of request, including a query, an executable command, and/or any other actionable statement. For example, a request may include a command to place a phone call or send a text message, may include a query for directions or a location, may include a question about the weather, and/or may include a question for a search engine. Numerous additional examples of requests may exist and may be processed from a received natural language input. Entity names may include objects of the processed request. For example, input entity names may include a contact to be called or texted, an address or establishment for which directions are sought, a location or time for which the weather is requested, and/or a target of a search engine query. Numerous other examples exist. Thus, a request and an input entity name, together may form a complete natural language input request, including both an action to be taken an object subject to that action. IRE 220 may process a received utterance to determine at least a type of request and an entity name.

Alternatively or additionally, NLP system 106 may use agent system 260, which includes system and domain specific agents, that assists in ASR, intent recognition, request generation, and/or request response. Agent system 260 may use nonvolatile storage (e.g., storage device 114 or storage device 144) to store data, parameters, history information, and locally stored content provided in the system databases 104 or other data sources. User specific data, parameters, and session and history information that may determine the behavior of the agents are stored in one or more user profiles 250. For example, user specific speech patterns may assist in ASR, while user preferences and history may assist in contextual determinations and, therefore, intent recognition.

The system agent provides default functionality and basic services. A domain specific agent relates to a corresponding domain of information (e.g., a business listing domain may relate to business listings, a contacts domain may relate to user contacts, a shopping domain may relate to commerce, etc.).

Agent system 260 create queries to local databases or though data sources on the Internet or other networks. Commands typically result in actions taken by the device on which NLP system 106 operates, or to a remote device or data source.

In implementations in which a response to a request is desired, agent system 260 may create a response string for presentation to the user. The response string may be presented as text and/or as speech, in which case the string is sent to the text to speech engine 230 to be output by a speaker (whether an on-board or off-board speaker).

Text-to-speech engine 230 may convert text to speech, such as when information from NLP system 106 (e.g., responses to spoken queries) is to be presented to a user in speech format. Conventional text-to-speech processors may be used for such text-to-speech generation.

A more detailed description of NLP processing is described in U.S. patent application Ser. No. 10/452,147, entitled "Systems and Methods for Responding Natural Language Speech Utterance," filed on Jun. 3, 2003, the disclosure of which is incorporated in its entirety herein. NLP system 260 may use the foregoing and/or other types of NLP processing techniques and systems.

Smart matching engine 270 may include additional instructions that program computer system 110. The instructions of smart matching engine 270 may include, without limitation, instructions for suggesting named entities to appropriate portions of a received natural language input, and/or other instructions that program computer system 110 to perform various operations, each of which are described in greater detail herein.

Smart matching engine 270 may operate to identify an input entity name. ASR engine 210 and IRE 220 may process a natural language input to determine a type of request and an input entity name. Smart matching engine 270 may then match the input entity name to an entity name that can be acted upon. For example, if the user requests directions to Main St., then smart matching engine 270 may operate to suggest a match between the user uttered input entity name "Main St." and an identified entity name—i.e., an actual, mappable, Main St. If the user asks to "call James," then smart matching engine 270 may operate to suggest a match between an identified entity name, i.e., an actual contact in the user's directory, and the input entity name of "James."

Smart matching engine 270 may suggest a match between an input entity name and at least one identified entity name based at least partially on an entity matching model. The entity matching model may comprise information compiled through machine learning techniques, and may include at least context information and user history information, as well as other information suitable for machine learning. A suggested match may include the input entity name and at least one identified entity name. In some embodiments, the at least one identified entity name may include a list of identified entity names. Thus, smart matching engine may identify multiple suggested matches between an input entity names A suggested match may further include additional entity match information.

Additional entity match information may include context information related to the natural language request, the input entity name, and the identified entity name. For example, for a user that lives in New York, an entity matching model may associate the entity name "taxi" in the request "call a taxi" with a particular taxi company in New York. When creating a suggested match for the input entity name "taxi," for that user, smart matching engine 270 may include the additional entity match information of the user's location as part of the suggested match. This may permit the system to disambiguate the term "taxi" differently based on the user's location.

Context information usable by smart matching engine 270 may include a request context. For example, if a user makes a request to "call James" during the business day, smart matching engine 270 may suggest a match between the input entity name James and a business contact named James. If the request is made after hours, smart matching engine 270 may suggest a match with a contact from a friends and family contact list. Similarly, when attempting to disambiguate requests for directions, smart matching engine may suggest matches between locations that are closer to a present location of the user.

User history information usable by smart matching engine 270 may include information about previous user requests and activity. For example, when requesting to make a call, smart matching engine 270 may select a name from a user's contact list that the user calls very frequently. When seeking directions, smart matching engine 270 may suggest a destination location that matches a location the user has travelled to frequently.

Smart matching engine 270 may additionally employ machine learned matching techniques. For example, a user may frequently refer to a contact name by a nickname, making a request to "call Jim," where the name "James" is stored in the user's contact list. Such a connection may become a part of an entity matching model based on machine learning techniques, as described in more detail below.

In some implementations smart matching engine 270 may suggest a match between an input entity name and an identified entity name based on an exact match. For example, where a user requests to "call John," the system may suggest only matches that match "John" exactly. In some implementations smart matching engine 270 may suggest a match between an input entity name and an identified entity name based on a phonetic match. For example, where a user requests to "call John," the system may suggest all matches that sound like "John," including, for example, "Jon." In some implementations smart matching engine 270 may suggest a match between an input entity name and an identified entity name based on similar sounds. Continuing to use the above example, smart matching engine 270 may suggest a match between "John" and "Juwan." In some implementations smart matching engine 270 may suggest a match between an input entity name and an identified entity name based on an interpretation of a user's pronunciation style.

In some implementations smart matching engine 270 may suggest a match between an input entity name and an identified entity name based on learned associations. For example, a user may request to "call my brother." Smart matching engine 270 may suggest a match between the input entity name "my brother," and all user contacts having a same last name as the user. Smart matching engine 270 may also request clarification from the user about the entity name "my brother." Once the system has successfully confirmed a match between a user contact and the input entity name "my brother," the entity matching model may be updated with the information in order to correctly link the input entity name "my brother" to the appropriate contact. In another example, a user may request directions to "the pizza place." Smart matching engine may propose a suggested match between the input entity name "the pizza place," and the closest pizza restaurant. Once the system has successfully confirmed a match between "the pizza place," and a particular pizza restaurant, the entity matching model may be updated to associate "the pizza place," with the specific pizza restaurant.

In some implementations, smart matching engine 270 may pass a suggested match between an input named entity and an identified named entity to confirmation engine 271 for command confirmation, as described below.

In some implementations, smart matching engine 270 may determine an alternate identified entity name if confirmation engine 271 is unable to confirm the suggested match between the input named entity and the identified entity name. In some implementations, smart matching engine 270 may determine an alternate identified entity name using similar methods to those described above for selecting the first identified entity name. In determining an alternate identified entity name, smart matching engine 270 may select a next best match for an input entity name. In some implementations, smart matching engine 270 may develop an n-best list of suggested matches for an input entity name including n number of potential matches ranked in order of best fit. Smart matching engine 270 may provide the $2^{nd}$, $3^{rd}$, $4^{th}$ etc., matches from an n-best list, in order, to confirmation engine 271 as alternate identified names if the first suggestion is cancelled or met with non-confirmation. In some implementations, smart matching engine 270 may provide an entire n-best list to confirmation engine 271.

Confirmation engine 271 may include additional instructions that program computer system 110. The instructions of confirmation engine 271 may include, without limitation, instructions for confirming a suggest match between a received natural language input and a named entity, and/or other instructions that computer system 110 to perform various operations, each of which are described in greater detail herein.

Confirmation engine 271 may perform command confirmation based on a user's confirmation history of a proposed entity match. Command confirmation may be performed actively and/or passively. For example, active command confirmation may include querying the user to confirm a suggest match—e.g., where a user has asked to "call James," a command confirmation may query the user "did you mean James Smith?" In some implementations, passive command confirmation may include permitting a user a predefined amount of time to cancel an action. For example, where a user has asked to "call James," a command confirmation may alert the user "calling James Smith," and wait for a predetermined amount of time to give the user a chance to cancel the action before executing the action. If the user does not cancel the action, then the suggested entity match may be confirmed. A predetermined amount of time may be relatively short, e.g., 1 to 5 seconds, or relatively long, e.g., 5-15 seconds. Selecting which command confirmation method to use may be based on a user's confirmation history.

For example, confirmation engine 271 may use a history of a user's confirmation between a particular input entity name and a particular identified entity name. For example, a user may ask to "call James," and suggestion engine 270 may determine a suggested match between the input entity name "James" and an identified entity name "James Smith," corresponding to a user contact. If suggestion engine 270 has previously suggested the same match, and the user has previously provided confirmations, confirmation engine 271 may alert the user of the impending action. If the user has not previously provided enough confirmations of the suggested match, confirmation engine 271 may request active confirmation from the user. Confirmation engine 271 may switch between these two methods when a number of previous confirmations of the suggested match exceeds a predetermined threshold number of times. Such a predetermined threshold number may be one or more times. A predetermined threshold number may vary depending on the type of entity name that is being matched (e.g., whether it is a contact name or a location address.)

In some implementations, confirmation engine 271 may update a number of previous confirmations of a suggested match in a user's confirmation history after confirmation or non-confirmation is received from the user. If confirmation is received from the user for a particular suggested match, confirmation engine 271 may increment the number of previous confirmations. If a user cancels or fails to confirm a suggested match, confirmation engine 271 may instead decrement the number of previous confirmations. In some implementations, confirmation engine 271 may reset a number of previous confirmations to zero after a non-confirmation is received. In some implementations, confirmation engine 271 may separately record a number of non-confirmations and decrement or reset the previous confirmation score after a threshold number of non-confirmations is reached. In some implementations, confirmation engine 271 may separately record a number of consecutive non-confirmations and decrement or reset the previous confirmation score after a threshold number of consecutive non-confirmations is reached. In some implementations, confirmation engine 271 may do nothing to a previous confirmation score when a non-confirmation is received.

In some implementations, confirmation engine 271 may request an alternate identified match from smart matching engine 270 if a non-confirmation or cancellation is received. Smart matching engine 270 may provide a next best alternate identified match to confirmation engine 271. Confirmation engine 271 may treat the alternate identified match similarly to the initial identified match, and determine an active or passive confirmation method based on a number of previous confirmations.

In some implementations, confirmation engine 271 may receive an n-best list from smart matching engine 270. Confirmation engine 271 may then try to confirm with the user each entry in the n-best list as a selected match. In some implementations, confirmation engine 271 may try each member of the n-best list in turn, using the above-discussed confirmation methods based on confirmation history. In some implementations, confirmation engine 271 may try to confirm the first entry of a an n-best list, and, if confirmation fails, query the user to select from the remaining entries in the n-best list.

Learning engine 272 may include additional instructions that program computer system 110. The instructions of learning engine 224 may include, without limitation, instructions for providing machine learning updates to a smart matching model used by smart matching engine 270 and confirmation engine 271 in suggesting and confirming matches between natural language inputs and named entities, and/or other instructions that computer system 110 to perform various operations, each of which are described in greater detail herein.

Learning engine 272 may include instructions for updating an entity matching model based on results provided by smart matching engine 270 and confirmation engine 271. As described above, smart matching engine 270 may suggest a match between an input entity name and an identified entity name, while confirmation engine 271 may operate to confirm the identified entity name and determine it as a selected entity name. When an entity name is confirmed as a selected entity name, learning engine 272 may update the entity matching model with information about the confirmed match. Learning engine 272 may update context information of the entity matching model with information about the context (e.g., time, location, whether the user is traveling, etc.) under which the suggested match was confirmed. Learning engine 272 may update user history information of the entity matching model, for example, to keep track of a frequency of user requests involving the selected entity name.

For example, where a user has a requested to make a phone call or send a text message to a contact and confirmation engine 271 confirms the suggested match provided by the smart matching engine 270, learning engine 272 may update the entity matching model with information about the match between the input entity name and the identified entity name, including, for example, time of day, location of the user, category of the entity name (e.g., business or personal contact), and any other suitable information. In some implementations, when confirmation engine 271 obtains a non-confirm result of a suggested match, learning engine 272 may update entity matching model with information that the match was not confirmed, as well as other context information associated with the failed match.

For example, a user may frequently his brother "James Lewis" in the evening but call his business associate "James Smith" during the day. Due to a frequency of calls, smart matching engine 270 may initially suggest a match between the request to "call James," and "James Smith," even when the call is taking place after 9 pm. After one or more non-confirmations between a command to "call James" at 9 pm and "James Smith," learning engine 272 may sufficiently update the entity matching model to make an association between "James" and the user's brother "James Lewis" in the evening, and between "James" and the user's business associate "James Smith" during the day.

Execution engine 273 may include additional instructions that program computer system 110. The instructions of execution engine 273 may include, without limitation, instructions for executing a natural language request, and/or other instructions that computer system 110 to perform various operations, each of which are described in greater detail herein.

Execution engine 273 may be configured to cause a computer system on which it is instantiated to carry out the action indicated by the request and the selected entity name determined from the processed natural language input. Execution engine 273 may be configured to engage any systems of the device or computer system on which it is instantiated to carry out the natural language request.

Furthermore, as previously noted, some or all aspects of the foregoing operations may be performed by a given component illustrated in FIG. 1. In particular, some or all aspects of the foregoing operations may be performed by computer system 110 and/or user device 140. In some instances, some operations relating to natural language processing may be performed by user device 140, while other operations are performed at computer system 110.

In some instances, the same operation relating to natural language processing may be performed by both user device 140 and computer system 110 (i.e., both user device 140 and computer system 110 may perform one or more of the operations relating to natural language processing). In implementations where NLP system 106 operates in a hybrid manner (e.g., one or more components of NLP system 106 are included in and operate at different remote devices such as computer system 110 and user device 140), communication manager 202 may mediate communication through a network, such as network 102.

For example, a version of ASR engine 210 operating and executing on user device 140 may convert spoken utterances into text, which is then provided to a version of IRE 220 operating and executing on computer system 110. Alternatively or additionally, a version of ASR engine 210 operating and executing on user device 140 may convert spoken utterances into text and a version of ASR engine 210 operating and executing on computer system 110 may also convert the spoken utterances into text, in which case one result may be chosen over.

A more detailed description of such hybrid natural language processing is disclosed in U.S. patent application Ser. No. 12/703,032, entitled "System and Method for Hybrid Processing in a Natural Language Voice Services Environment," filed on Feb. 9, 2010, the disclosure of which is incorporated in its entirety herein. The foregoing or other hybrid systems may be used for NLP system 106.

Figure 3:
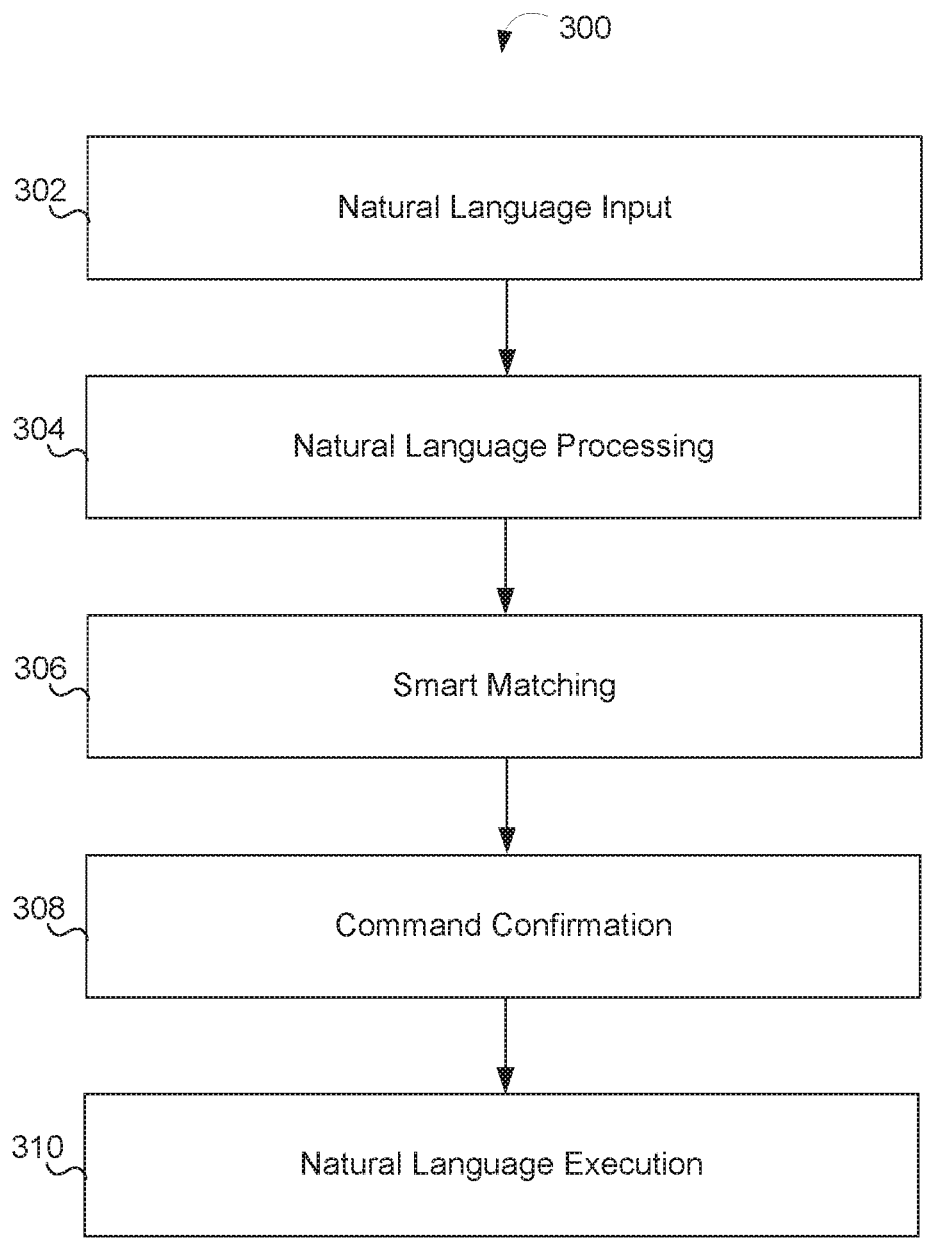
FIG. 3 depicts a process of natural language processing disambiguation, according to an implementation of the invention.

FIG. 3 depicts a process 300 of natural language processing disambiguation, according to an implementation of the invention. The various processing operations and/or data flows depicted in FIG. 3 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 302, process 300 may include a natural language input operation. In natural language input operation 300 NLP system 106 receives a natural language input, such as a verbal utterance, from the user. The utterance may be received, for example, via a microphone incorporated into user device 140. ASR manager 210 of NLP subsystem 106 may receive the utterance.

In an operation 304, process 300 may include an natural language processing operation. Operation 304 may perform natural language processing on the received natural language input. Components of NLP subsystem 106 may cooperate to process the received natural language input to determine at least a request and an entity name. For example, as described above with respect to FIG. 2, ASR engine 210 may perform automatic speech recognition on the natural language input and IRE 220 may perform intent recognition on the natural language input. NLP subsystem 106 may thus determine a request and an input entity name from the user's natural language input.

In an operation 306, process 300 may include a smart matching step. During a smart matching operation 306, smart matching engine 270 may determine a suggested match between the input entity name and an identified entity name. Smart matching engine 270 may access an entity matching model, including context information, user history, and machine learned user tendencies to determine a suggested match.

In an operation 308, process 300 may include an entity match confirmation step. An entity match confirmation operation may be performed by confirmation engine 271. Confirmation engine 271 may determine whether to designate the identified entity name as a selected entity name, based on a user's confirmation history of suggested matches between the identified entity name and the input entity name. The user's confirmation history may be used to determine a method, e.g., active or passive, by which confirmation engine 271 confirms the entity name. Entity match confirmation operation 308 may be understood in more detail with reference to FIG. 4.

Figure 4:
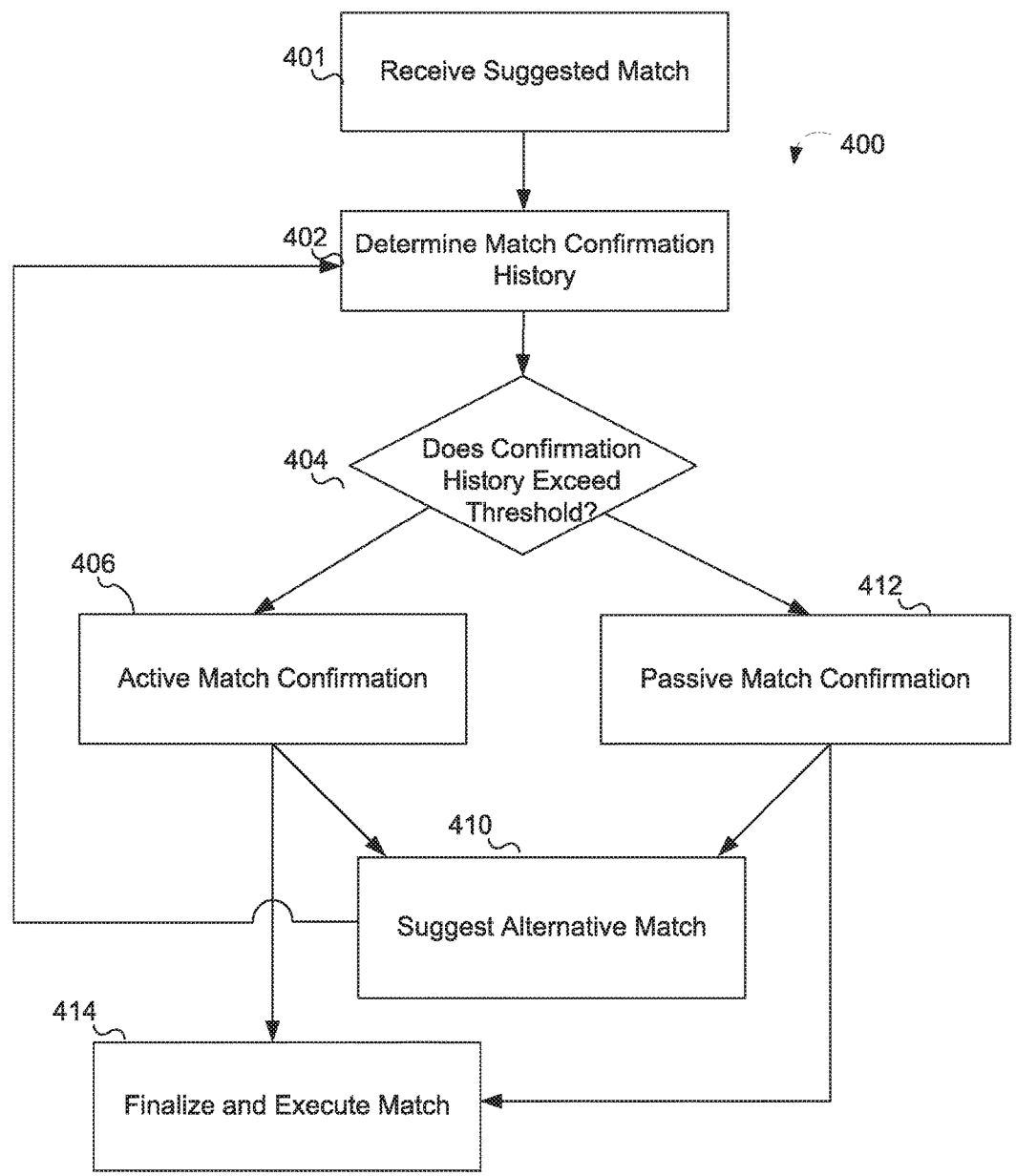
FIG. 4 depicts a process of disambiguation machine learning, according to an implementation of the invention.

FIG. 4 depicts a process 400 of natural language match confirmation, according to an implementation of the invention. The various processing operations and/or data flows depicted in FIG. X (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 401, process 400 may include a suggested match reception step. During suggested match reception operation, confirmation engine 271 may receive information about a suggested match from smart matching operation 270. Confirmation engine 271 may receive the input entity name and the suggested match for it, i.e., the identified entity name.

In an operation 402, process 400 may include a match confirmation history determination step. Match confirmation history determination operation 402 may access a user history database 180/190 to determine a user command confirmation history associated with the suggested match. The user command confirmation history may include a previous confirmations counter comprising information about a user's previous confirmations of the suggested match between the input entity name and identified entity name. For example, a user's confirmation history may include the information that a user has confirmed a particular match 9 times, cancelled that match 2 times, and confirmed the previous 6 suggestions of the match.

In some implementations, the user command confirmation history may further include additional entity match information, which may include the context of a user's confirmation history with respect to a suggested match. For example, additional entity match information may include information about circumstances under which a user has confirmed a suggested match. For example, where a user has made the request to "call James," and the suggested match is with the identified entity "James Smith" the business associate, the additional entity match information may include the information that the user has confirmed this suggested match 13 times during business hours, but cancelled the match 7 times during evening hours. During match confirmation history determination operation 402, confirmation engine 271 may determine the number of previous confirmations by a user of the suggested match between the input entity name and the identified entity name, and may further use additional entity match information to make the determination.

In an operation 404, process 400 may include a confirmation history thresholding step. Confirmation history thresholding operation 404 may include comparing the number of previous confirmations by the user to a predetermined threshold number of confirmations. Confirmation history thresholding operation 404 may include determining whether the previous number of confirmations exceeds or fails to exceed the predetermined threshold number of confirmations.

In an operation 406, process 400 may include an active match confirmation step. If confirmation engine 271 determines that a number of previous confirmations does not exceed a predetermined confirmation threshold number, process 400 may proceed to an active confirmation request operation 406. During active confirmation request operation 406, confirmation engine 271 may cause the host system to query the use for active confirmation of the suggested match provided by smart matching engine 270. For example, where a user has requested directions to the input entity name "233 Main St.," the system may actively request that the user confirm the identified entity name by querying the user "Did you mean 233 Main St, Cambridge, Mass.?" When a match has been confirmed by the user, confirmation engine 271 may designate the confirmed entity name as a selected entity name for subsequent execution. Confirmation engine 271 may further update the previous confirmation history with the information that the suggested match has been confirmed. Such updating may include incrementing a number of previous confirmations, incrementing a number of previous consecutive confirmations, and/or providing any additional entity match information about the context in which the suggested match was confirmed.

When a match has been cancelled or decline by the user, confirmation engine 271 may designate the identified entity name as a non-match, and proceed to an alternative match suggestion operation 410. Confirmation engine 271 may further update the previous confirmation history with the information that the suggested match was not confirmed. Such updating may include decrementing a number of previous confirmations, resetting a number of previous consecutive confirmations, resetting a total number of previous confirmations, and/or providing any additional entity match information about the context in which the suggested match was cancelled.

In an operation 410, process 400 may include an alternative match suggestion step. Confirmation engine 271 may perform an alternative match suggestion operation after a user has cancelled or failed to confirm an initially suggested match provided by smart matching engine 270 (either in operation 406 or an operation 412). In some implementations, confirmation engine 271 may request that smart matching engine 270 provide a next best match for the input entity name. Confirmation engine 271 may then suggest this next best match as an alternate identified entity name to the user for confirmation. In some implementations, confirmation engine 271 may select a next best match from an n-best list that has already been provided by smart matching engine 270. Confirmation engine 271 may then suggest this next best match as an alternate identified entity name to the user for confirmation. In some implementations, confirmation engine 271 may provide, to the user, multiple potential matches, e.g., from an n-best list provided by smart matching engine 270, from which the user may select an alternate identified entity name for confirmation. After alternate match suggestion step 410, process flow may return to catch confirmation history determination operation 402 and repeat steps 402, 404, 406, and/or 412 using the alternate identified entity name.

In an operation 412, process 400 may include a passive confirmation operation. If confirmation engine 271, at thresholding step 404, determines that a number of previous confirmations exceeds a predetermined confirmation threshold number, process 400 may proceed to an passive confirmation request operation 412. A passive confirmation operation 412 may be performed by confirmation engine 271 when the user has previously confirmed the suggested match more than a certain number of times. After multiple past confirmations, the system may determine a higher level of certainty in the suggested match, and not require that the user actively confirm the match. A passive confirmation operation may proceed by alerting the user (e.g., by an audio prompt or a display prompt) that an action based on the request and the identified entity name will be carried out. A predetermined pause period may then be introduced to give the opportunity to the user to cancel the action. If the user does not cancel the action, then confirmation engine 271 may confirm the suggested match. If the user does issue a cancellation command, then confirmation engine 271 may designate the suggested match as non-confirmed.

When a match has been confirmed by the user, confirmation engine 271 may designate the confirmed entity name as a selected entity name for subsequent execution at operation 414. Confirmation engine 271 may further update the previous confirmation history with the information that the suggested match has been confirmed. Such updating may include incrementing a number of previous confirmations, incrementing a number of previous consecutive confirmations, and/or providing any additional entity match information about the context in which the suggested match was confirmed.

When a match has been cancelled or non-confirmed by the user, confirmation engine 271 may designate the identified entity name as a non-match, and proceed to an alternative match suggestion operation 410. Confirmation engine 271 may further update the previous confirmation history with the information that the suggested match was not confirmed. Such updating may include decrementing a number of previous confirmations, resetting a number of previous consecutive confirmations, resetting a total number of previous confirmations, and/or providing any additional entity match information about the context in which the suggested match was cancelled.

In an operation 414, process 400 may include a selected match finalization operation. Selected match finalization operation 414 may be performed by confirmation engine 271 to pass the confirmed selected entity name to execution engine 273. During operation 414, information about the confirmed match, e.g., the selected entity name and any additional match entity information, may be passed to learning engine 272 to update the entity matching model.

Returning now to FIG. 3, in an operation 310, process 310 may include a natural language execution step. After confirmation of the identified entity name as the selected entity name during command confirmation operation 308, natural language execution operation 310 may be performed by execution engine 273 to cause the system to carry out the request on the selected entity name. For example, the request may include a phone dialing request and the selected entity name may be a user object. Execution of this natural language result would cause a device of the user to initiate a phone call. The request may include a search request, and the selected entity name may include a search object. Execution of this natural language result would cause a device of the user to carry out a search for information about the search object. The request may include a navigation request, and the selected entity name may include a street address or other physical location. Execution of this statement would cause the device of the user to provide the user with directions to the street address or physical location.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of natural language disambiguation, the method being implemented in a computer system having one or more physical processors programmed with computer program instructions that, when executed by the one or more physical processors, cause the computer system to perform the method, the method comprising:
    processing, by the computer system, using an intent recognition engine, a natural language input;
    determining, by the computer system, based on the processing, at least a type of request and an input entity name;
    identifying, by the computer system, at least a first match between the input entity name and a first identified entity name and at least a second match between the input entity name and a second identified entity name;
    selectively performing, by the computer system, one of a passive confirmation or an active confirmation of whether the first identified entity name or the second identified entity name was intended by the natural language input, depending on a threshold comparison applied to previous confirmation history of a number of previous confirmations of whether the first identified entity name or the second entity name was intended by the natural language input,
    wherein the active confirmation comprises:
        requesting, by the computer system, a confirmation of whether the first identified entity name or the second identified entity name was intended by the natural language input; and
        receiving, by the computer system, a response to the requested confirmation;
    wherein the passive confirmation comprises:
        selecting, as a response, the first identified entity name or the second identified entity name as the intended entity name;
    generating, by the computer system, a request based on the type of request and the response; and
    updating the number of previous responses regarding whether the first identified entity name or the second identified entity name was intended by the natural language input.

2. The computer implemented method of claim 1, wherein the input entity name includes at least one of a contact name, an address, or a business name.

3. The computer implemented method of claim 1, wherein the type of request includes a phone dialing request and the first identified entity name or the second identified entity name includes a user contact.

4. The computer implemented method of claim 1, wherein the type of request includes a search query and the first identified entity name or the second identified entity name includes a search object.

5. The computer implemented method of claim 1, wherein the type of request includes a navigation query and the first identified entity name or the second identified entity name includes a street address.

6. The computer implemented method of claim 1, wherein identifying at least a first match between the input entity name and the first identified entity name and at least a second match between the input entity name and the second identified entity name is at least partially based on at least one of a user location, a time of day, a user request history, a user request frequency, and a user preference.

7. The computer implemented method of claim 1, wherein identifying at least a first match between the input entity name and the first identified entity name and at least a second match between the input entity name and the second identified entity name is at least partially based on a user preference for contacting at least one of family, friends, and business associates.

8. The computer implemented method of claim 1, wherein:
    the active confirmation is performed if a number of previous confirmations of whether the first identified entity name or the second identified entity name was intended by the natural language input is below a predetermined threshold; and
    wherein the passive confirmation is performed if a number of previous confirmations of whether the first identified entity name or the second identified entity name was intended by the natural language input is above a predetermined threshold.

9. The computer implemented method of claim 1, wherein the method further comprises:
alerting the user that execution of the request will be performed;
waiting, by the computer system, a predetermined amount of time for user cancellation of the announced execution prior to executing the request; and
updating the number of previous responses regarding whether the first identified entity name or the second identified entity name was intended by the natural language input.

10. The computer implemented method of claim 9, further comprising:
receiving, by the computer system, a cancellation command from the user;
requesting that the user select an alternate request different from the generated request; and
storing the alternate request selected by the user for use in future natural language input processing.

11. The computer implemented method of claim 1, wherein the method further comprises:
processing, by the computer system, using the intent recognition engine, a second natural language input;
determining, by the computer system, a second input entity name based on the processing;
identifying, by the computer system, at least a third match between the second input entity name and the first identified entity name and at least a fourth match between the second input entity name and the second identified entity name;
determining, by the computer system, that the first number of times that the first identified entity name was intended exceeds a predetermined threshold; and
determining, by the computer system, that the first identified entity name is intended by the second natural language input based on the determination that the first number of times that the first identified entity name was intended exceeds the predetermined threshold.

12. The computer implemented method of claim 1, wherein requesting a confirmation comprises:
requesting that the user provide an alternate entity name, different from the first identified entity name and the second identified entity name;
providing information about the alternate entity name as the response to the requested confirmation,
and wherein the method further comprises:
storing, by the computer system, information indicating the response for use in future natural language input processing.

13. The computer implemented method of claim 1, further comprising:
updating the intent recognition engine with information indicating a match between the input entity name and the first identified entity name or second identified entity name based on one of the passive confirmation or the active confirmation,
wherein the computer system recognizes the first identified entity name and the second identified entity name as being an exact match.

14. The computer implemented method of claim 1, further comprising:
updating the intent recognition engine with information indicating a match between the input entity name and the first identified entity name or second identified entity name based on one of the passive confirmation or the active confirmation,
wherein the computer system recognizes the first identified entity name and the second identified entity name as being a phonetic match.

15. The computer implemented method of claim 1, further comprising:
updating the intent recognition engine with information indicating a match between the input entity name and the first identified entity name or second identified entity name based on one of the passive confirmation or the active confirmation,
wherein the computer system recognizes the first identified entity name and the second identified entity name as being a partial match.

16. A system of natural language disambiguation, the system comprising:
a computer system comprising one or more physical processors programmed by computer program instructions that, when executed, cause the computer system to:
process, using an intent recognition engine, a natural language input;
determine, based on the processed natural language input, at least a type of request and an input entity name;
identify at least a first match between the input entity name and a first identified entity name and at least a second match between the input entity name and a second identified entity name;
selectively perform one of a passive confirmation or an active confirmation of whether the first identified entity name or the second identified entity name was intended by the natural language input, depending on a threshold comparison applied to previous confirmation history of a number of previous confirmations of whether the first identified entity name or the second entity name was intended by the natural language input,
wherein the active confirmation comprises:
requesting a confirmation of whether the first identified entity name or the second identified entity name was intended by the natural language input; and
receiving a response to the requested confirmation;
wherein the passive confirmation comprises:
selecting, as a response, the first identified entity name or the second identified entity name as the intended entity name;
generate a request based on the type of request and the response; and
update the number of previous responses regarding whether the first identified entity name or the second identified entity name was intended by the natural language input.

17. The system of claim 16, wherein the input entity name includes at least one of a contact name, an address, and a business name.

18. The system of claim 16, wherein the request includes a phone dialing request and the first identified entity name or the second identified entity name includes a user contact.

19. The system of claim 16, wherein the type of request includes a search query and the first identified entity name or the second identified entity name includes a search object.

20. The system of claim 16, wherein the type of request includes a navigation query and the first identified entity name or the second identified entity name includes a street address.

21. The system of claim 16, wherein the computer program instructions further cause the computer system to:
identify at least the first match between the input entity name and the first identified entity name and at least the second match between the input entity name and the second identified entity name at least partially based on at least one of a user location, a time of day, a user request history, a user request frequency, and a user preference.

22. The system of claim 16, wherein the computer program instructions further cause the computer system to:
identify at least the first match between the input entity name and the first identified entity name and at least the second match between the input entity name and the second identified entity name at least partially based on user preferences including a preference for contacting at least one of family, friends, and business associates.

23. The system of claim 16, wherein the computer program instructions further cause the computer system to:
perform the active confirmation if a number of previous confirmations of whether the first identified entity name or the second identified entity name was intended by the natural language input is below a predetermined threshold; and
perform the passive confirmation if a number of previous confirmations of whether the first identified entity name or the second identified entity name was intended by the natural language input is above a predetermined threshold.

24. The system of claim 16, wherein
the computer program instructions further cause the computer system to:
alert the user that execution of the intended request will be performed;
wait a predetermined amount of time for user cancellation of the announced execution prior to executing the intended request; and
update the number of previous responses regarding whether the first identified entity name or the second identified entity name was intended by the natural language input.

25. The system of claim 24, further comprising instructions to cause the computer system to:
receive a cancellation command from the user;
request that the user select an alternate request different from the generated request; and
store the alternate request selected by the user for use in future natural language input processing.

26. The system of claim 16,
wherein the computer program instructions further cause the computer system to:
process, using the intent recognition engine, a second natural language input;
identify a second input entity name based on the processing;
identify at least a third match between the second input entity name and the first identified entity name and at least a fourth match between the second input entity name and the second identified entity name;
determine that the first number of times that the first identified entity name was intended exceeds a predetermined threshold; and
determine that the first identified entity name is intended by the second natural language input based on the determination that the first number of times that the first identified entity name was intended exceeds the predetermined threshold.

27. The system of claim 16, wherein the computer program instructions to request a confirmation further cause the computer system to:
request that the user provide an alternate entity name, different from the first identified entity name and the second identified entity name;
provide information about the alternate entity name as the response to the requested confirmation, and
wherein the computer system is further caused to store information indicating the response for use in future natural language input processing.

28. The system of claim 16, wherein the computer program instructions further cause the computer system to:
update the intent recognition engine with information indicating a match between the input entity name and the first identified entity name or second identified entity name based on one of the passive confirmation or the active confirmation,
wherein the computer system recognizes the first identified entity name and the second identified entity name as being an exact match.

29. The system of claim 16, wherein the computer program instructions further cause the computer system to:
update the intent recognition engine with information indicating a match between the input entity name and the first identified entity name or second identified entity name based on one of the passive confirmation or the active confirmation,
wherein the computer system recognizes the first identified entity name and the second identified entity name as being a phonetic match.

30. The system of claim 16, wherein the computer program instructions further cause the computer system to:
update the intent recognition engine with information indicating a match between the input entity name and the first identified entity name or second identified entity name based on one of the passive confirmation or the active confirmation,
wherein the computer system recognizes the first identified entity name and the second identified entity name as being a partial match.

\* \* \* \* \*